United States Patent
Beeman

(10) Patent No.: US 12,385,248 B2
(45) Date of Patent: Aug. 12, 2025

(54) STRUCTURAL UNITS FOR BUILDING CONSTRUCTION AND METHODS OF USE THEREOF

(71) Applicant: New Village Initiative LLC, Park Rapids, MN (US)

(72) Inventor: Gary Beeman, Park Rapids, MN (US)

(73) Assignee: New Village Initiative LLC, Park Rapids, MN (US)

( * ) Notice: Subject to any disclaimer, the term of this patent is extended or adjusted under 35 U.S.C. 154(b) by 290 days.

(21) Appl. No.: 17/992,110

(22) Filed: Nov. 22, 2022

(65) Prior Publication Data

US 2023/0160200 A1 May 25, 2023

Related U.S. Application Data

(60) Provisional application No. 63/282,888, filed on Nov. 24, 2021.

(51) Int. Cl.

| | |
|---|---|
| *E04B 2/42* | (2006.01) |
| *C04B 20/10* | (2006.01) |
| *C04B 26/02* | (2006.01) |
| *C04B 28/04* | (2006.01) |
| *E04B 2/02* | (2006.01) |
| *E04B 5/04* | (2006.01) |
| *E04B 7/20* | (2006.01) |

(52) U.S. Cl.
CPC ............ *E04B 2/42* (2013.01); *C04B 20/107* (2013.01); *C04B 20/1074* (2013.01); *C04B 26/02* (2013.01); *C04B 28/04* (2013.01); *E04B 2002/0228* (2013.01); *E04B 2002/0263* (2013.01); *E04B 5/04* (2013.01); *E04B 7/20* (2013.01); *E04B 2103/02* (2013.01)

(58) Field of Classification Search
CPC ..... E04B 2/42; E04B 5/04; E04B 7/20; E04B 2002/0228; E04B 2002/0263; E04B 2103/02; E04B 2002/0217; E04B 2/08; E04B 2/18; E04C 2/04; E04C 2/10; E04C 2/521
See application file for complete search history.

(56) References Cited

U.S. PATENT DOCUMENTS

| | | | | |
|---|---|---|---|---|
| 6,434,890 | B1* | 8/2002 | Konnerth | E04C 2/521 52/220.1 |
| 10,526,783 | B2* | 1/2020 | Hon | E04B 2/18 |
| 10,787,810 | B2* | 9/2020 | Bergollo | E04B 2/18 |
| 11,680,403 | B2* | 6/2023 | Perez | E04C 2/34 52/302.3 |
| 2002/0026759 | A1* | 3/2002 | Schmitz | E04C 1/397 52/284 |
| 2007/0163197 | A1* | 7/2007 | Payne | E04B 1/14 52/287.1 |

(Continued)

*Primary Examiner* — Rodney Mintz
(74) *Attorney, Agent, or Firm* — Eckert Seamans Cherin & Mellott, LLC

(57) ABSTRACT

An interlocking system of modular units engageable to form vertically and horizontally stable assemblies. The modular units include blocks and modular panels, each having vertical and optional horizontal bores that provide passage for plumbing, electrical wiring, and other connectivity. The modular units may be formed of lightweight cementitious materials, and may find use in assemblies such as walls, floors, ceilings, roofs, and entire building structures.

18 Claims, 21 Drawing Sheets

(56) References Cited

U.S. PATENT DOCUMENTS

| | | | |
|---|---|---|---|
| 2018/0245339 A1* | 8/2018 | Hon | E04B 2/18 |
| 2020/0181905 A1* | 6/2020 | Jarck | E04C 2/46 |
| 2020/0217066 A1* | 7/2020 | Bergollo | E04B 2/08 |
| 2022/0090379 A1* | 3/2022 | Perez | E04C 2/08 |

* cited by examiner

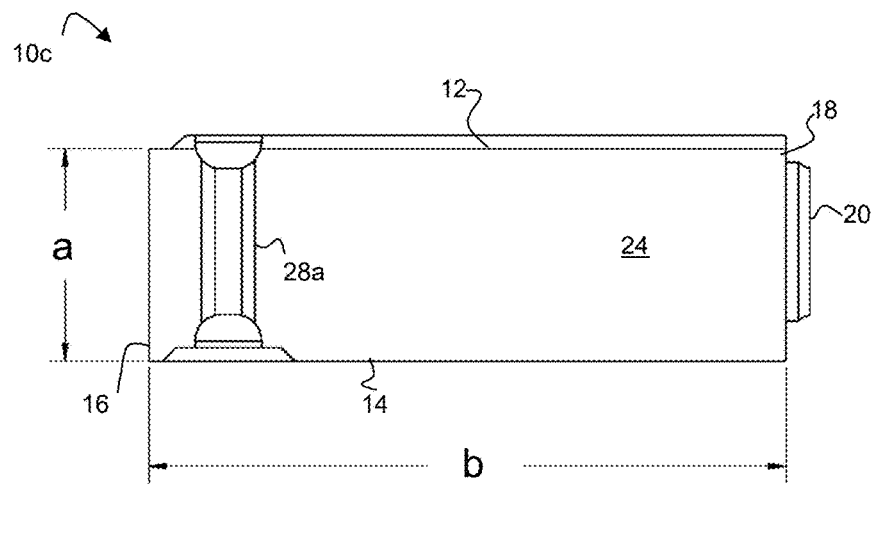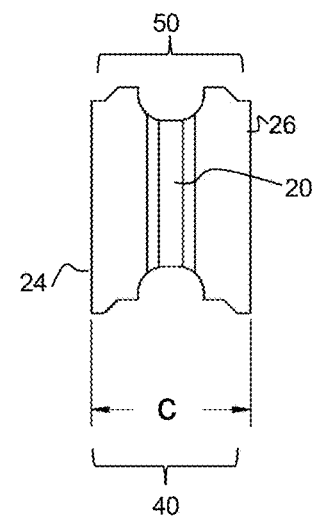
FIG. 11A　　　　　FIG. 11B
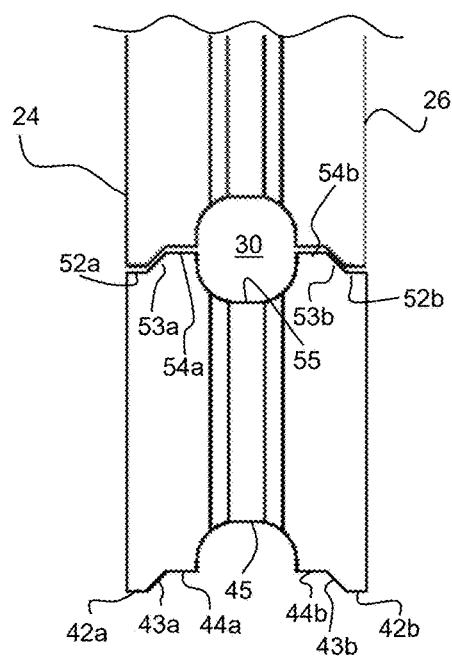
FIG. 11C

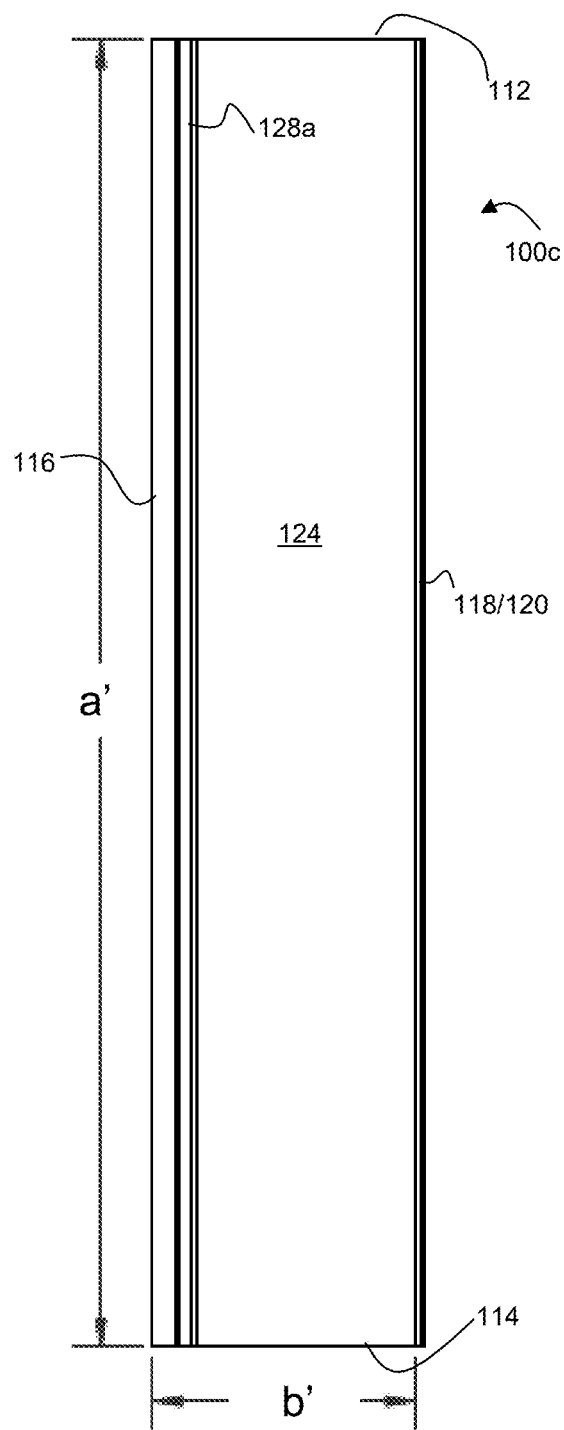
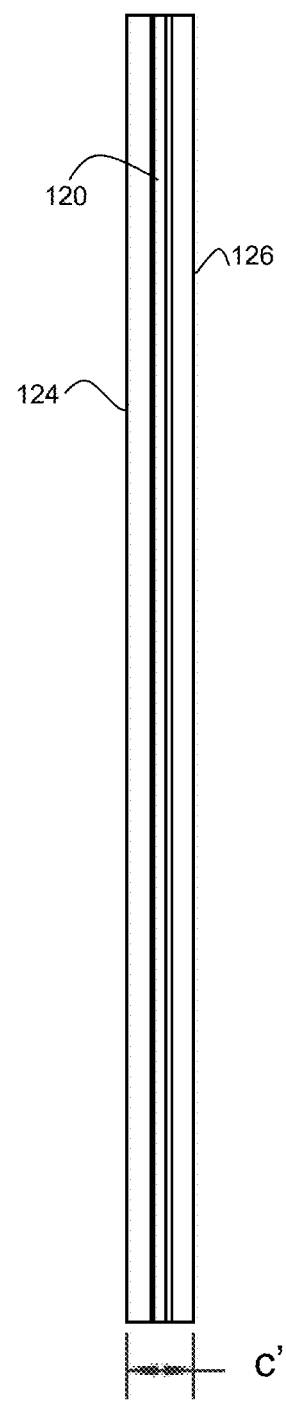
FIG. 23A  FIG. 23B

STRUCTURAL UNITS FOR BUILDING CONSTRUCTION AND METHODS OF USE THEREOF

CROSS-REFERENCE TO RELATED APPLICATIONS

The present application claims the benefit under 35 U.S.C. § 119(e) of prior U.S. Provisional Application Ser. No. 63/282,888, filed Nov. 24, 2021, the entire content of which is incorporated herein by reference.

FIELD OF THE INVENTION

The invention relates generally to modular blocks and modular panels useful for construction of various structures, structures formed with the modular blocks and modular panels, and systems and methods for designing structures composed of the modular blocks and modular panels.

BACKGROUND

Home buyers of today demand products that are cost-effective, flexible in use, long-lived, and environmentally friendly. In the construction industry, the cost of materials and labor are key factors that are taken into account when planning and constructing a building or other structure. To reduce the cost of some or all of these factors and still meet the demands of buyers, various materials have been developed such as cement board siding, high efficiency energy saving windows, and engineered wood products. In other examples, prefabrication techniques have been used to construct homes in factories.

With the recent increases in material costs, labor shortages, and a trend toward consumer desire for more environmentally friendly and energy efficient materials, there is need for construction systems that provide reliably strong building components capable of withstanding high load stresses. Moreover, a construction system that incurs a reduced transportation cost due to a reduction in weight of the components and reduced labor costs due to ease of installation would be beneficial. A construction system that is pre-engineered to incorporate reinforcement within the components and provide a means to tie each component together with simple connection elements would also be beneficial. Finally, a construction system that utilizes components having greater generality of use and modularity would be beneficial.

SUMMARY OF THE INVENTION

The disclosed inventions advantageously fill these needs and others by providing modular blocks and modular panels useful for construction of structures such as walls, floors, ceilings, roofs, walkways, paths, driveways, and the like, that may be combined to provide assemblies of these structures such as sheds, homes, commercial buildings, and the like.

As used herein, the term "structure" may be understood to mean any grouping of the modular blocks and/or modular panels that are connected either vertically and/or horizontally. Structures may include all or a portion of a wall, floor, ceiling, roof, walkway, driveway, and the like. Further, as used herein, the term "assembly" may be understood to mean any grouping of structures, such as to form a building, e.g., shed, house, commercial building, and the like.

Accordingly, the present disclosure provides modular blocks useful for construction of stable structures. The modular blocks include connection elements at ends thereof that allow for horizontal connection between blocks. The modular blocks further comprise connection elements on top and bottom sides thereof that provide for vertical stacking and connection between blocks. Each of these connection elements, i.e., vertical and horizontal connection elements, provide for stable attachment or connection between blocks that does not require mortar or other mechanical linking elements. Each of the modular blocks may include no vertical bores or one or more vertical bores. When the modular blocks are stacked, the vertical bores may align to provide extended vertical passageways. Moreover, when the blocks are stacked the connection elements at top and bottoms sides of the modular blocks may provide a horizontal bore therebetween.

According to one specific configuration of the modular blocks disclosed herein, each modular block may comprise top and bottom sides, front and back faces, a first end, and a second end. A first horizontal channel is recessed in the top side and extends between the first end and a central point proximal to the second end of the modular block on the top side. A second horizontal channel is recessed in the bottom side and extends between the first end and the central point proximal to the second end of the modular block on the bottom side. The first horizontal channel of a first modular block is configured for connection with the second horizontal channel of a second modular block and forms a horizontal bore therebetween.

The first horizontal channel may comprise an outer horizontal shelf adjacent each of the front and back faces, an inner horizontal shelf spaced apart from the outer horizontal shelf on each of the front and back faces and connected thereto by an outwardly sloped region, and a semicircular recess extending between the inner horizontal shelf on each of the front and back faces.

The second horizontal channel may comprise an outer horizontal shelf adjacent each of the front and back faces, an inner horizontal shelf spaced apart from the outer horizontal shelf on each of the front and back faces and connected thereto by an inwardly sloped region, and a semicircular recess extending between the inner horizontal shelf on each of the front and back faces. The semicircular recess of each of the first and second horizontal channels form the horizontal bore when adjacent modular blocks are connected.

Each modular block may include no vertical bores, or may include at least one vertical bore that extends through the modular block from the top side to the bottom side thereof. The at least one vertical bore is generally centrally positioned, such as equidistant from each of the front and back faces. According to certain aspects, the modular block may include two, three, or more vertical bores spaced apart between the first and second ends. The at least one horizontal bore may intersect the at least one vertical bore forming a continuous channel extending both vertically and horizontally.

A connection element, such as a male connection element, may be positioned on either or both of the first end and the second end of the modular block, wherein the male connection element is configured for attachment to a female connection element of another modular block. The male connection element may extend the first and second horizontal channels.

The modular block may include the male connection element positioned on each of the first and second ends. The modular block may comprise the male connection element positioned on the first end, and a female connection element positioned on any one or more of (i) the second end, (ii) the front face proximal to the second end, or (iii) the back face proximal to the second end. The female connection element may extend inward to the central point proximal to the second end.

According to certain aspects, the present disclosure provides modular panels useful for construction of stable structures. The modular panels include connection elements at sides thereof that allow for horizontal connection between modular panels. Each of the modular panels may include no vertical or horizontal bores or one or more vertical bores and/or one or more horizontal bores. When the modular panels are connected horizontally, the horizontal bores may align to provide extended horizontal passageways. Moreover, the modular panels may be stacked (e.g., connected) vertically, and any vertical bores may align to provide extended vertical passageways.

According to one specific configuration of the modular panels disclosed herein, each modular panel comprises top and bottom ends defining a modular panel length, front and back faces, and first and second sides defining a modular panel width. At least one vertical bore extending through the modular panel from the top end to the bottom end thereof is included, as well as a male connection element positioned on either or both of the first side and the second side. The male connection element may be configured for attachment to a female connection element of another modular panel.

The modular panel may include the male connection element on each of the first and second sides. The modular panel may include the male connection element positioned on the first side, and a female connection element positioned on any one or more of (i) the second side, (ii) the front face proximal to the second side, (iii) the back face proximal to the second side, or a combination thereof.

The at least one vertical bore may be positioned centrally, such as equidistant between the front and back faces. According to certain aspects, the modular panel may comprise three vertical bores centrally located on the modular panel between the front and back faces and spaced apart between the first and second sides.

The modular panel may include at least one horizontal bore extending through the modular panel from the first side to the second side thereof. The at least one horizontal bore may intersect the at least one vertical bore forming a continuous channel extending both vertically and horizontally.

The stable structures formed by the modular blocks and/or modular panels may be interior walls, exterior walls, pathways, driveways, floors, ceilings, roofs, furniture components (e.g., kitchen islands, bathtub surrounds, etc.), and larger assemblies of the structures such as buildings, sheds, garages, and the like.

The modular blocks and/or modular panels may be formed of standard construction materials, such as cementitious construction materials (e.g., cement, fiber reinforced cement, etc.), composite wood materials (e.g., wood fiber and binder mixed with any of cement, plastics, aggregate, and the like), plastics, wood, and the like.

According to certain aspects, the modular blocks and/or modular panels may be formed of a hybrid construction material (hybrid composite) comprising a cementitious binder; an aggregate; and 1 to 80 wt. % of a hybrid additive, such as 10 to 60 wt. %, wherein the wt. % is based on a total weight of the hybrid construction material.

Exemplary hybrid additives include virgin or recycled plastic or polymeric materials and fibers. The virgin or recycled plastic or polymeric materials may be powderized, such as having a size of 5 microns up to 250 microns, or may be spherical or non-spherical pellets with a size of up to 2 inches. When provided as pellets, the hybrid additive may be coated with a cementitious material such as calcium carbonate; pozzolanic materials such as siliceous and calcareous fly ashes, natural and industrial pozzolans, metakaolin and silica fume; graphene; carbon nanotubes; and the like.

The present disclosure further provides an interlocking system of modular units engageable to form vertically and horizontally stable structures, wherein the modular units comprise a plurality of any of the modular blocks and/or modular panels disclosed hereinabove. The presently disclosed modular blocks and modular panels may include vertical and/or horizontal passages or bores in and between the assembled blocks and modular panels that provide passage for electrical wiring and components, plumbing, heating and cooling elements, whole-house vacuum, ventilation, and the like. The vertical and/or horizontal bores may also provide space or passage for reinforcement elements such as poured concrete, hybrid construction materials, re-bar, and threaded attachment elements.

The present disclosure further provides kits comprising a plurality of the modular blocks and/or modular panels configured to form larger structures, such as walls, floors, ceilings, roofs, rooms, or larger structures as described herein. The kits may include additional components, such as unique connection elements configured for attachment of the modular blocks and modular panels, such as when forming a foundation of a structure or a roof of a structure. The kits may comprise additional components, such as headers for doorways and windows, trusses, and the like that may be sized and configured to work with the modular blocks and modular panels disclosed herein. The kits may further comprise roof tiles, pavers for walkways or driveways, and the like. Each of these components may be formed of standard cementitious materials or may be formed of the hybrid construction materials disclosed herein.

The present disclosure further provides methods of forming structures (e.g., walls, floors, etc.) and assemblies of these structures (e.g., buildings) using any of the modular blocks and/or modular panels disclosed hereinabove.

The present disclosure further provides software systems, applications, and methods for designing a structure or assembly of structures comprising a plurality of any of the modular blocks and/or modular panels disclosed hereinabove. The systems, applications, and methods may allow a user to design a structure or assembly of structures de novo, or modify designs provided by the system or previously saved by the user. The systems, applications, and methods are configured to relate the user designed structure or assembly of structures to a total number of blocks, modular panels, and additional components needed to build the designed structure, and may provide instructions for the same. Moreover, the systems, applications, and methods may further provide a kit containing the total number of modular blocks, modular panels, and additional components needed to build the designed structure.

BRIEF DESCRIPTION OF THE DRAWINGS

Aspects, features, benefits, and advantages of the embodiments herein will be apparent with regard to the following description, appended claims, and accompanying drawings.

FIGS. 11A and 11B illustrate a front face and an end view, respectively, of a modular block according to aspects of the present disclosure.

FIGS. 11C and 11D illustrate two modular blocks connected horizontally and stacked, respectively, to form an assembly according to aspects of the present disclosure.

FIGS. 23A and 23B illustrate front and side views, respectively, of the modular panels according to aspects of the present disclosure.

DETAILED DESCRIPTION

Figure 1:
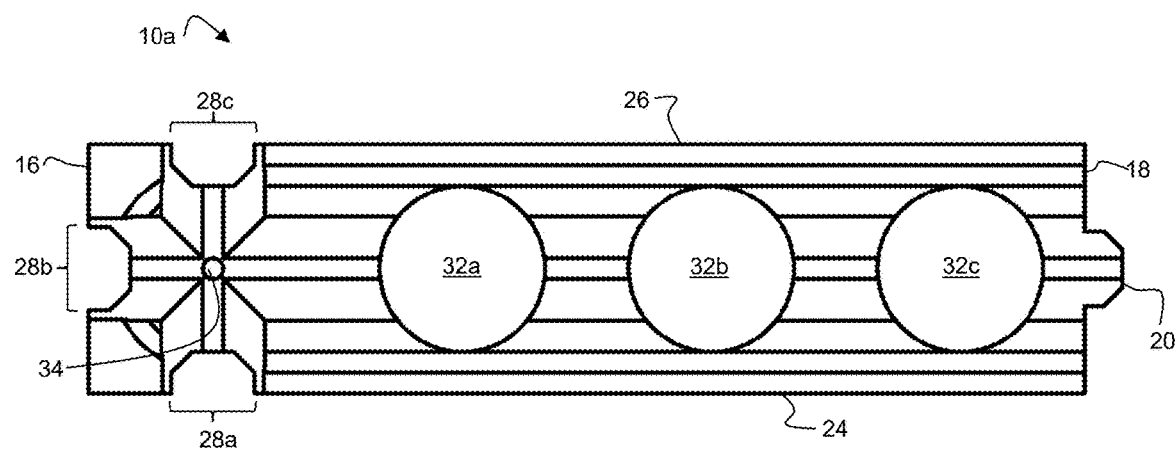
FIGS. 1-9 illustrate top views of various modular block designs according to aspects of the present disclosure.

The present invention is related to engineered structural building blocks ("modular blocks") and engineered structural panels ("modular panels"). The modular blocks and modular panels provided herein facilitate the construction of cost-effective building structures while at the same time providing a wide variety of design choices for consumers. The structures created from these blocks and modular panels provide shelter and protection for building occupants, contribute to structural strength of the building as a whole, and facilitate the integration of auxiliary systems (e.g., electrical or plumbing systems). Exemplary structures formed using the modular blocks and modular panels include walls, floors, foundations, ceilings, and roofs of buildings. Exemplary structures further include any type of residential or commercial building, storage structure or vessel, bridge, retaining wall, levee, aerospace structure, or high-rise structure.

Definitions and Abbreviations

Throughout this description and in the appended claims, use of the singular includes the plural and plural encompasses singular, unless specifically stated otherwise. For example, although reference is made herein to "an", "a", and "the", one or more of any of these components and/or any other components described herein can be used.

The word "comprising" and forms of the word "comprising", as used in this description and in the claims, does not limit the present invention to exclude any variants or additions. Additionally, although the present invention has been described in terms of "comprising", the modular blocks and modular panels, and methods of making and using the same, that are detailed herein may also be described as consisting essentially of or consisting of. For example, while the invention has been described in terms of a modular block comprising a specific arrangement of channels and bores, a modular block consisting essentially of the specific arrangement of channels and bores is also within the present scope. In this context, "consisting essentially of" means that any additional components or features will not materially change the functionality of the modular block.

Furthermore, the use of "or" means "and/or" unless specifically stated otherwise. "Including" and like terms means including, but not limited to. When ranges are given, any endpoints of those ranges and/or numbers within those ranges can be combined within the scope of the present invention.

Other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and appended claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

While specific definitions have been provided hereinabove for the terms "structure" and "assembly," they may be used interchangeably throughout the present disclosure unless specified otherwise, and may include any three-dimensional structure formed in part or in total with the modular blocks and/or modular panels disclosed herein, such as any shed, storage building, residential or commercial building, wall, floor, ceiling, roof, foundation, levee, retaining wall, and the like.

The term "aggregate" is used herein to denote any hard, inert, typically mineral material that is bound together by a binder. The term "binder" is used herein to denote any material that binds, glues, adheres, or bonds aggregates together. Examples of common construction material binders include but are not limited to Portland cement, cements, pozzolans, epoxies, glues, adhesives, grouts, clays, and hydrated lime that can come in solid, liquid, emulsion, slurry, powder, pelletized, or gaseous form.

The term "hybrid additive" is used herein to denote any material that improves the bonding of the aggregate and binder in order to achieve the desired performance properties, such as strength, lighter weight, improved insulation performance, improved sound absorption, moisture resistance, resistance to deformation, and cracking resistance. The hybrid additive generally comprises structural engineered polymers from virgin and/or recycled sources, and engineering structural plastics, singularly or in combination, that come from industrial and consumer sources. Exemplary polymers include at least the following classes of plastics alone or in any combination: elastomers, thermosetting plastics, and thermoplastics, which may be recyclable or non-recyclable. The polymers may be formed into beads that may be expanded.

Certain of the described methods and/or their equivalents may be implemented with computer executable instructions. Thus, according to aspects of the present disclosure, a non-transitory computer readable/storage medium may be configured with stored computer executable instructions of an algorithm/executable application that, when executed by a machine(s), cause the machine(s) (and/or associated components) to perform the method. Example machines include but are not limited to a processor, a computer, a server operating in a cloud computing system, a server configured in a Software as a Service (SaaS) architecture, a smart phone, and so on. According to certain aspects, a computing device is implemented with one or more executable algorithms that are configured to perform any of the disclosed methods.

The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM), qubits, or other memory devices. The memory may store an operating system that controls or allocates resources of a computing device.

A "database", as used herein, may refer to a digitally stored data on the form of a table, a set of digitally stored tables, and a set of data stores (e.g., disks) and/or methods for accessing and/or manipulating those data stores.

A "user device", as used herein, may be a computing device typically having a display screen with a user input (e.g., touch, voice, keyboard) and a processor for computing. User devices can include handheld devices, mobile phones, smart phones, laptops, tablets, e-readers, virtual and/or augmented reality devices, desktop computers, mainframe computers, and the like.

ASPECTS OF THE PRESENT DISCLOSURE

The modular blocks and modular panels described herein may be connected to form larger assemblies having excellent load bearing strength, thus providing improved structural support, such as greater wind and shock resistance, while at the same time having sizes and weights that are portable and easily handled by a user. For example, the connection elements provided on each block and modular panel allow for quick connection between the modular blocks and/or modular panels that does not require mortar or other connection elements. While no mortar is required, in certain configurations, the modular blocks and modular panels may be joined with uniquely designed connectors, and/or may include additional strengthening elements within the vertical and/or horizontal bores, such as rebar, poured concrete, and the like.

Moreover, when formed of the novel hybrid construction materials disclosed herein, the modular blocks and modular panels are also lighter weight than prior art construction blocks/modular panels, yet provide improved thermal and sound insulation, and improved resistance to wear and environmental deterioration from moisture. As example, the novel designs of the vertical and horizontal connection elements disclosed herein reduce moisture intrusion between blocks and modular panels. When formed of the hybrid construction materials, the modular blocks and modular panels have increased moisture resistance, and generally do not wick moisture therethrough.

Alternatively, when the modular blocks and modular panels are intended for use in driveways, walkways, and pavers, it may be desirable for the composite construction materials forming these components to be moisture or water pervious to avoid water pooling on these surfaces during inclement weather. In such a scenario, the hybrid additives may be configured to provide pores in the composite construction materials, and thus pores in the final modular blocks and modular panels.

A major advantage of the modular blocks and modular panels of the present disclosure is the use of recycled materials, i.e., when the hybrid additive is sourced from recycled materials in part or in total. Each pound of recycled material in the hybrid additive included in the modular blocks and modular panels provides a carbon dioxide reduction of about one pound. When one considers that the average American home would require in excess of 100,000 pounds of concrete blocks, the hybrid materials and modular blocks and modular panels of the present disclosure could reduce, on average, 60,000 pounds of carbon for a new construction project.

Unlike known prior art modular systems, such as cement blocks, the disclosed modular blocks and assemblies provide air/space for conventional integration of plumbing components, electrical components, insulation components, or other types of components standard in residential and commercial construction (e.g., whole home vacuum, air purification, etc.). The vertical and/or horizontal bores may also provide space or passage for reinforcement elements such as poured concrete, hybrid construction materials, re-bar, and threaded attachment elements.

A specific design for the modular blocks will be discussed with reference to FIGS. 1-12, and a specific design for the modular panels will be discussed with reference to FIGS. 13-23B. Larger assemblies of the blocks and modular panels are discussed with reference to FIGS. 24-30, and novel materials useful for forming the blocks and modular panels are discussed with reference to test results presented in FIGS. 31-33.

Modular Blocks

With reference to FIGS. 1-9, top views of various configurations of the modular blocks of the present disclosure are illustrated (modular blocks 10a-10i). Side (i.e., front and back faces) and end views of one such configuration (modular block 10c) are shown in FIGS. 11A and 11B, respectively. These figures illustrate a modular block having a top side 12, a bottom side 14, a first end 18, a second end 16, a front face 24, and a back face 26.

Each of the modular blocks may comprise at least one vertical bore 32 that passes from the top side 12 to the bottom side 14 through a full height of the block (defined by 'a' in FIG. 11A). The vertical bore is centrally position in the modular block, such as equidistant from the front and back faces thereof (e.g., central within a thickness of the block as defined by 'c' of FIG. 11B). According to various aspects, the modular blocks may comprise two, three, or more vertical bores. As shown in FIGS. 1-10, the modular blocks may preferably comprise three vertical bores (32a-c) spaced apart from each other along the length of the block (defined by 'b' in FIG. 11A).

Each of the modular blocks disclosed herein also include a male connection element 20 on the first end 18. The male connection element 20 is configured for connection with a female connection element on an adjacent block.

Figure 6:
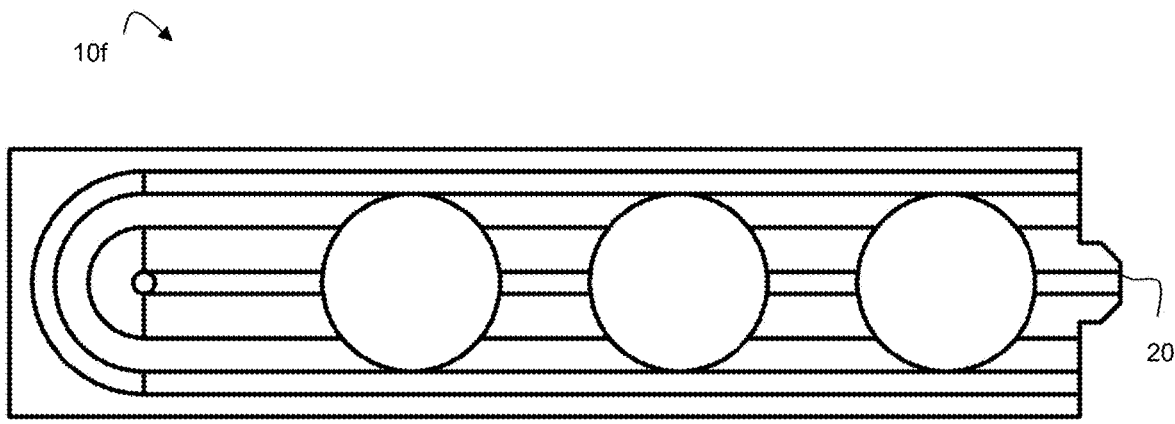
Figure 9:
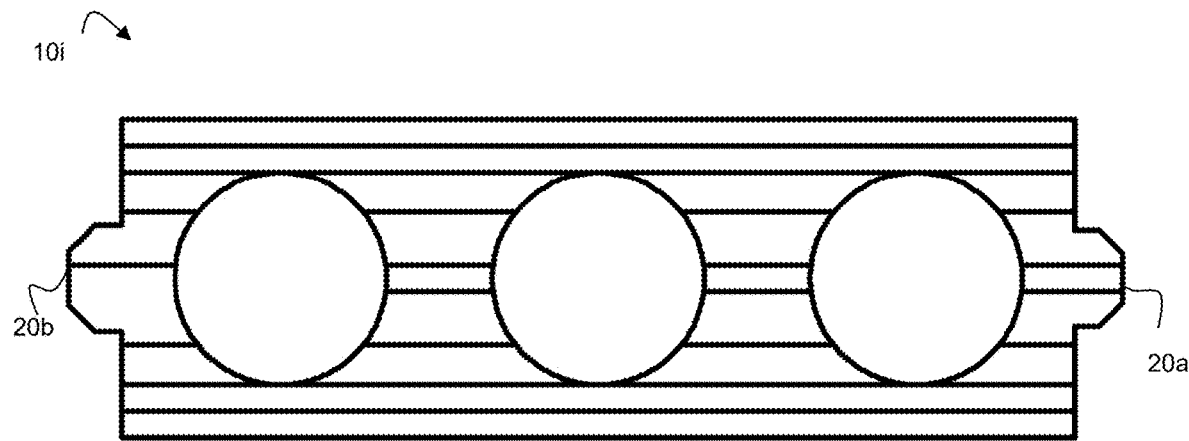

As shown in FIG. 6, the modular block 10f may include only one male connection element 20 on the first end 18. As shown in FIG. 9, the modular block 10i may include a male connection element (20a, 20b) on each of the first end 18 and the second end 16, respectively.

The modular blocks disclosed herein may comprise one or more female connection elements. For example, the modular block may comprise one or more female connection elements and no male connection element. Alternatively, the modular blocks may comprise one or more female connection elements and a male connection element 20 on the first end 18.

Figure 2:
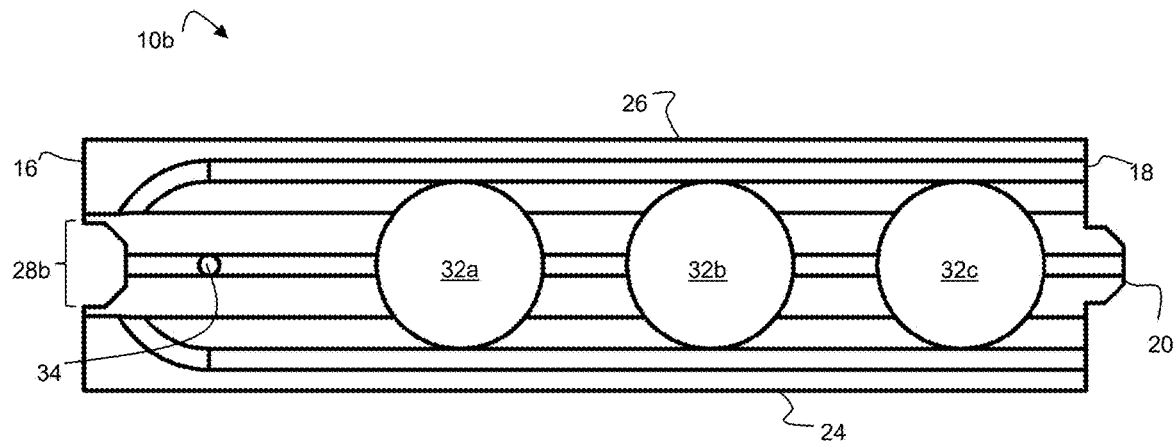
Figure 7:
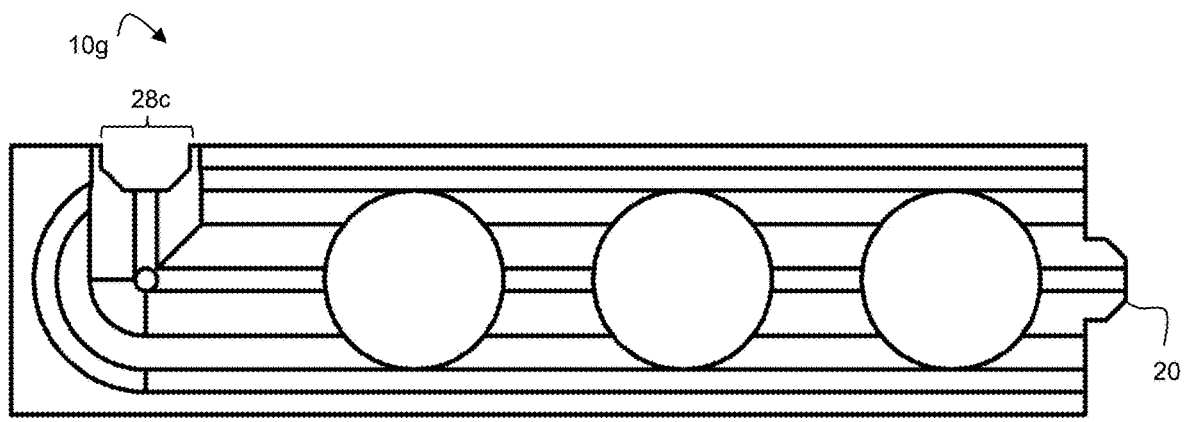
Figure 8:
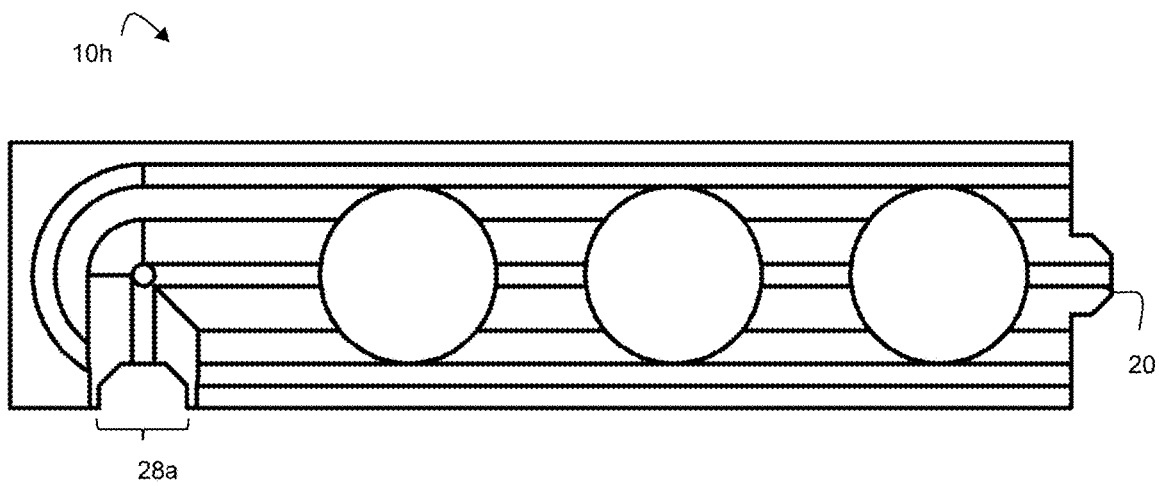

As shown in FIGS. 2, 7, and 8, the modular block may comprise a single female connection element. With specific reference to FIG. 2, the modular block 10b comprises the female connection element 28b positioned on the second end 16. With specific reference to FIG. 7, the modular block 10g comprises the female connection element 28a at a position proximal to the second end 16 on the front face 24. With specific reference to FIG. 8, the modular block 10h comprises the female connection element 28c at a position proximal to the second end 16 on the back face 26.

Figure 3:
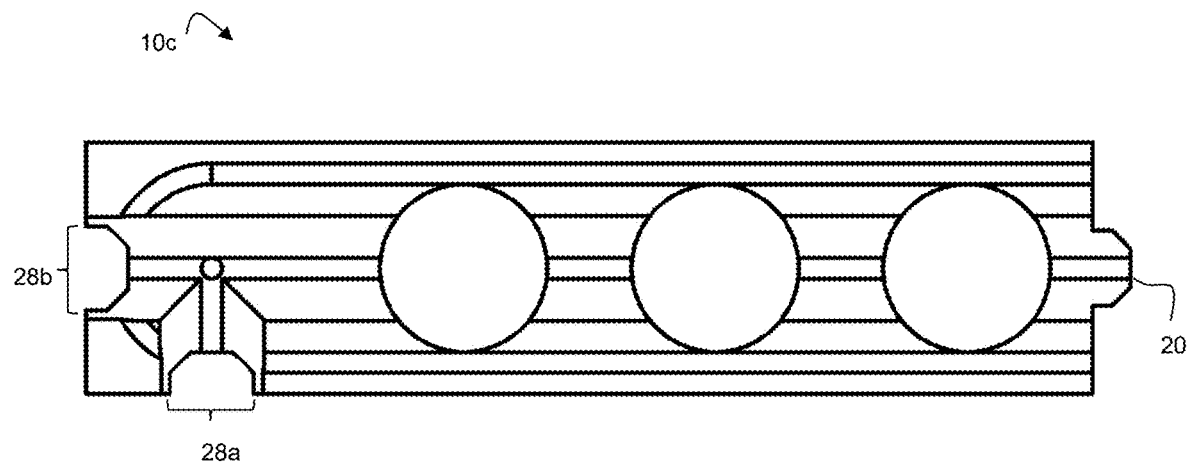
Figure 4:
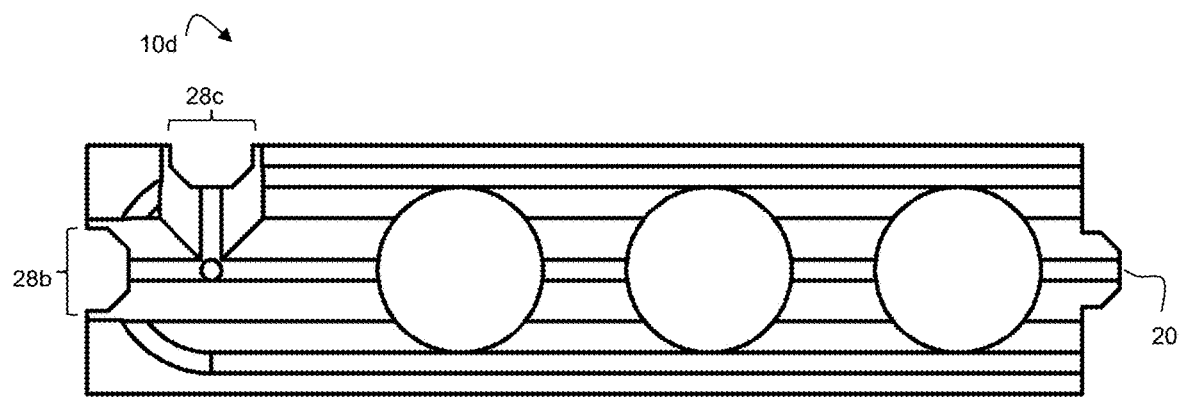
Figure 5:
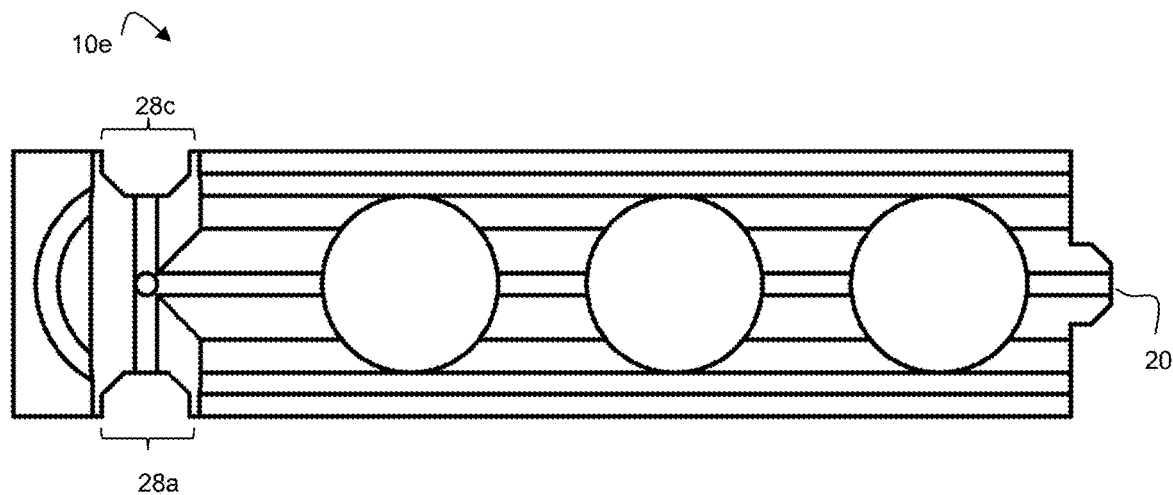

As shown in FIGS. 3, 4, and 5, the modular block may comprise two female connection elements. With specific reference to FIG. 3, the modular block 10c comprises a female connection element 28b on the second end 16 and a female connection element 28a at a position proximal to the second end 16 on the front face 24. With specific reference to FIG. 4, the modular block 10d comprises a female connection element 28b on the second end 16 and a female connection element 28c at a position proximal to the second end 16 on the back face 26. With specific reference to FIG. 5, the modular block 10e comprises a female connection element 28a at a position proximal to the second end 16 on the front face 24 and a female connection element 28c at a position proximal to the second end 16 on the back face 26.

As shown in FIG. 1, the modular block 10a may comprise a female connection element on all three of the second end 16, a position proximal to the second end 16 on the front face 24, and a position proximal to the second end 16 on the back face 26, i.e., female connection elements 28b, 28a, and 28c, respectively.

Figure 10:
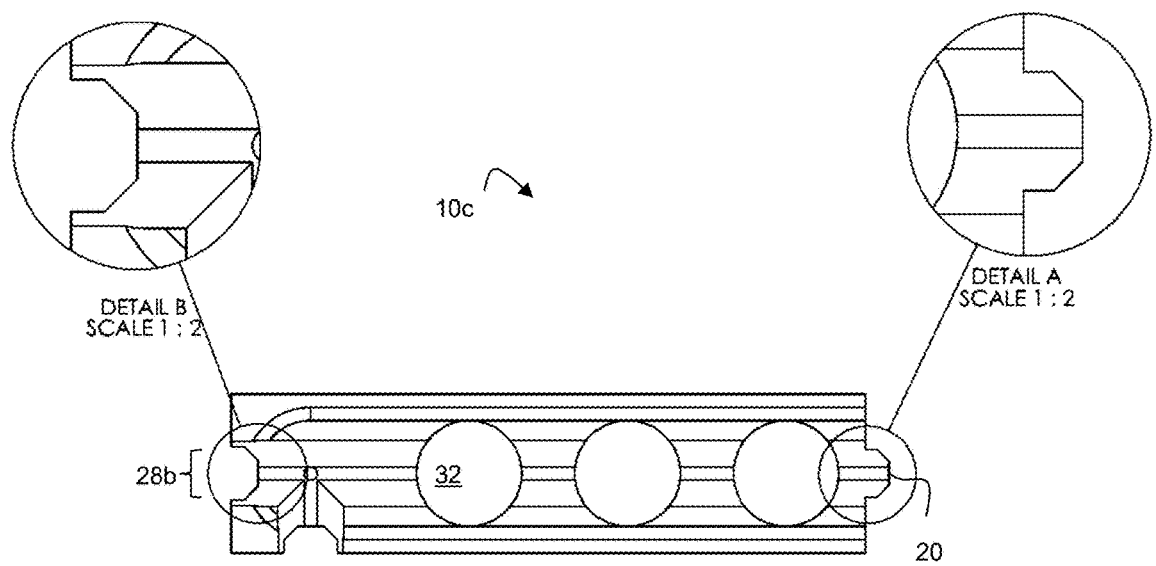
FIG. 10 illustrates close-up views of details of the connection portions of opposing ends of the modular blocks according to aspects of the present disclosure.
Figure 11D:
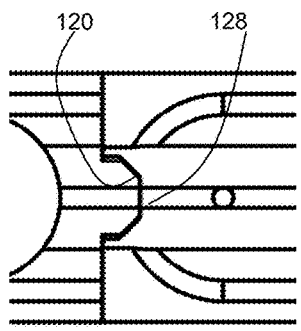

Close-up detail views of a male connection element 20 and a female connection element 28b are shown in FIG. 10 for modular block 10c. The male connection element extends outward away from the first end 18 of the modular block while the female connection element extends inward from the second end 16 (see FIG. 11A depicting a length of the modular block). The male connection element of one modular block is configured for snug connection with the female connection element (28a-c) on an adjacent block, as shown in FIG. 11D. While a specific design is shown for each of these connection elements (20, 28a-c), other designs are possible and within the scope of the presently disclosed invention.

According to certain aspects, each of the female connection elements (28a-c) extend inward from an edge of the modular block toward a central point 34 on the top and bottom sides thereof. For example, and with reference to FIG. 1, the female connection element 28b extends inward from the second end 16 of the modular block toward the central point 34, wherein the central point is equidistant from each of the second end and each of the front and back faces of the modular block.

The various configurations of the modular blocks shown in FIGS. 1-9 allow for connections between adjacent blocks that provide a wide range of larger assemblies or arrangements, e.g., corners, tees, straight lines, crosses, etc.

As shown in FIG. 11B, each of the modular blocks may also comprise a horizontal channel on the top side (first horizontal channel 50) and a horizontal channel on the bottom side (second horizontal channel 40). The first and second horizontal channels of adjacent blocks are configured to provide connection therebetween so that the modular blocks may be stacked. Once stacked, the first and second horizontal channels of adjacent blocks form a horizontal bore 30 therebetween that provides passage for conventional integration of plumbing components, electrical components, insulation components, or other types of components standard in residential and commercial construction (e.g., whole home vacuum, air purification, etc.).

With reference to FIGS. 1-8, the first and second horizontal channels (50, 40, respectively) extend from the first end 18 of the modular block inward toward the central point 34 proximal to the second end 16 thereof. The first and second horizontal channels (50, 40) may be extended by the male connection element 20 as shown in the detail of FIG. 10 so that when adjacent blocks are connected, there is no break in the horizontal channel.

With reference to FIG. 11C, the first horizontal channel 50 in the top side 12 of the modular block includes an outer horizontal shelf 52a,b adjacent each of the front 24 and back 26 faces, respectively. The first horizontal channel 50 further includes an inner horizontal shelf 54a,b spaced apart from the outer horizontal shelf 52a,b on each of the front and back faces, respectively. The outer and inner horizontal shelves adjacent each face of the modular block are connected by an outwardly sloped region 53a,b. As such, outwardly sloped region 53a,b and the inner horizonal shelves 54a,b extend above the top side 12 of the modular block (height of the modular block is defined by 'a' in FIG. 11A). The inner horizontal shelves 54a,b on each of the front and back faces are connect via a semicircular recess 55.

With continued reference to FIG. 11C, the second horizontal channel 40 in the bottom side 14 of the modular block includes an outer horizontal shelf 42a,b adjacent each of the front 24 and back 26 faces, respectively. The second horizontal channel 40 further includes an inner horizontal shelf 44a,b spaced apart from the outer horizontal shelf 42a,b on each of the front and back faces, respectively. The outer and inner horizonal shelves adjacent each face of the modular block are connected by an inwardly sloped region 43a,b. As such, inwardly sloped region 43a,b and the inner horizontal shelves 44a,b extend below the bottom side 14 of the modular block (height of the modular block is defined by 'a' in FIG. 11A). The inner horizontal shelves 44a,b on each of the front and back faces are connect via a semicircular recess 45.

The semicircular recess (55, 45) of each of the first and second horizontal channels (50, 40) form the horizontal bore 30 when adjacent modular blocks are connected. The horizontal bore 30 formed between adjacent blocks may intersect with the at least one vertical bore 32 forming a continuous channel extending both vertically and horizontally. This further extends the possible range of components that may be integrated within the larger assemblies of modular blocks, e.g., plumbing components, electrical components, insulation components, and the like.

Modular Panels

Figure 22:
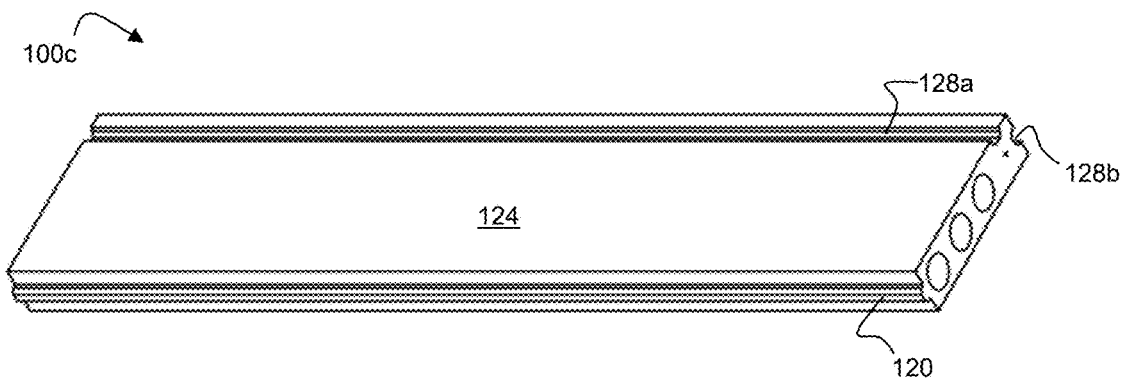
FIG. 22 illustrates a perspective front view of a modular panel according to aspects of the present disclosure.

With reference to FIGS. 12-20, end views of various configurations of the modular panels of the present disclosure are illustrated (modular panels 100a-100l). Front and back face views and first and second views of one such configuration (modular block 10c) are shown in FIGS. 22, 23A, and 23B.

These figures illustrate a modular panel having a top end 112, a bottom end 114, a first side 118, a second side 116, a front face 124, and a back face 126. Each of the modular panels disclosed herein also include a male connection element 120 on the first side 118. The male connection element 120 is configured for connection with a female connection element on an adjacent modular panel.

Figure 17:
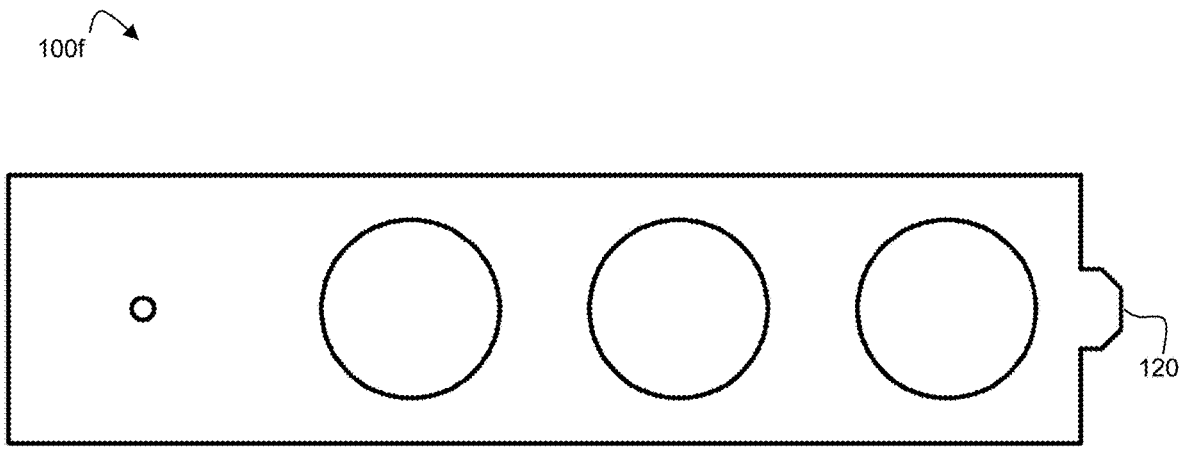
Figure 20:
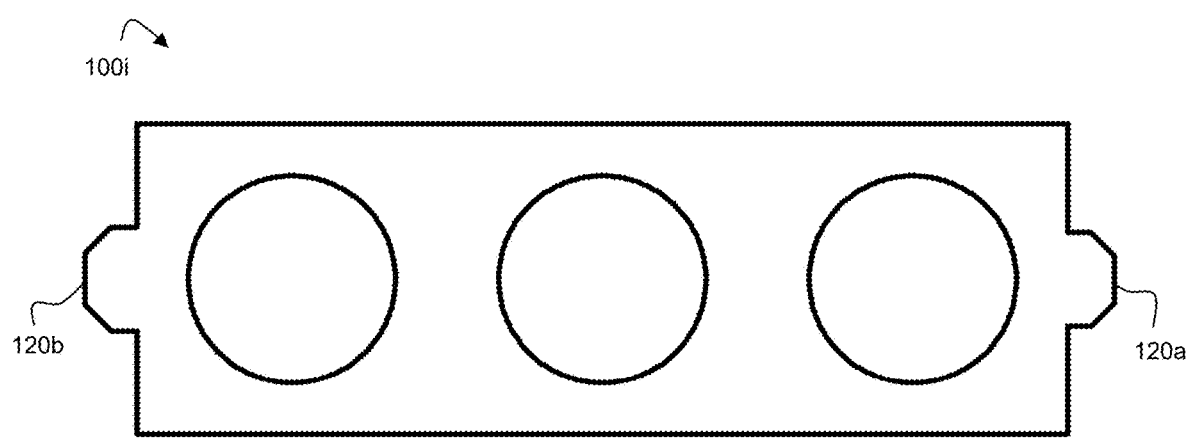

As shown in FIG. 17, the modular panel 100f may include only one male connection element 120 on the first side 118. As shown in FIG. 20, the modular panel 100i may include a male connection element (120a, 120b) on each of the first side 118 and the second side 116, respectively.

The modular panels disclosed herein may comprise one or more female connection elements. For example, the modular panel may comprise one or more female connection elements and no male connection element. Alternatively, the modular panels may comprise one or more female connection elements and a male connection element 120 on the first side 118.

Figure 13:
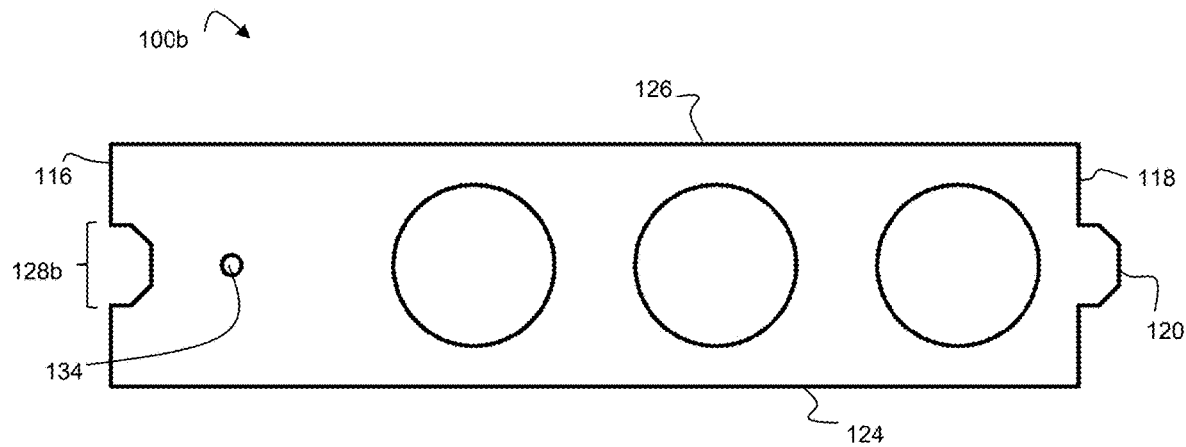
Figure 18:
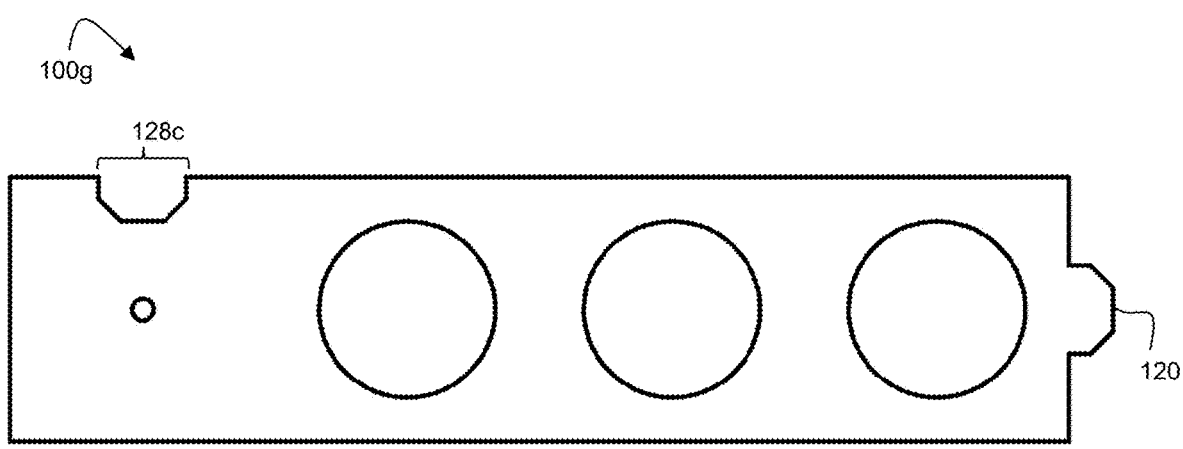
Figure 19:
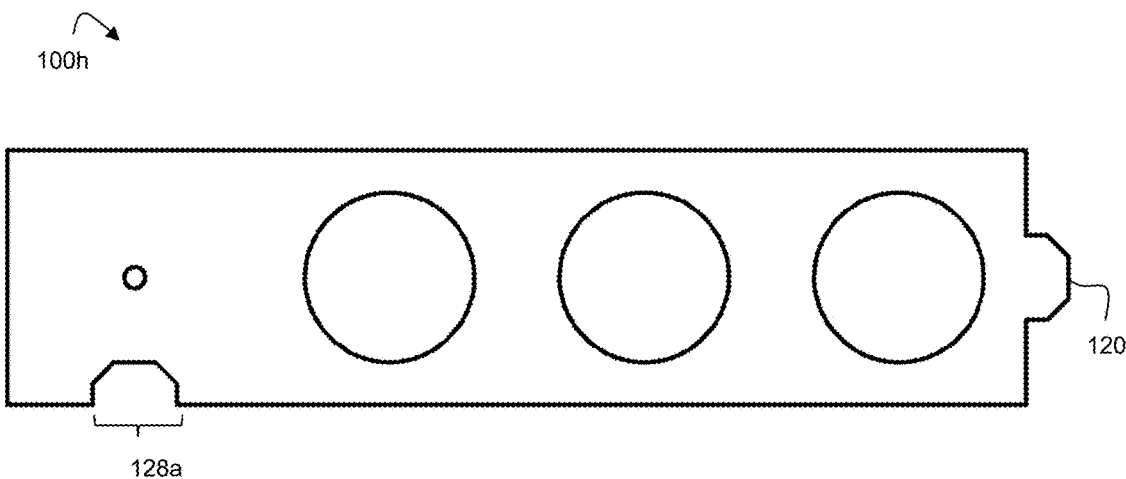

As shown in FIGS. 13, 18, and 19, the modular panel may comprise a single female connection element on: (i) the second side 116, i.e., female connection element 128b as shown in FIG. 13 for modular panel 100b; (ii) a position proximal to the second side 116 on the front face 124, i.e., female connection element 128a as shown in FIG. 18 for modular panel 100g; or (iii) a position proximal to the second side 116 on the back face 126, i.e., female connection element 128c as shown in FIG. 19 for modular panel 100h.

Figure 14:
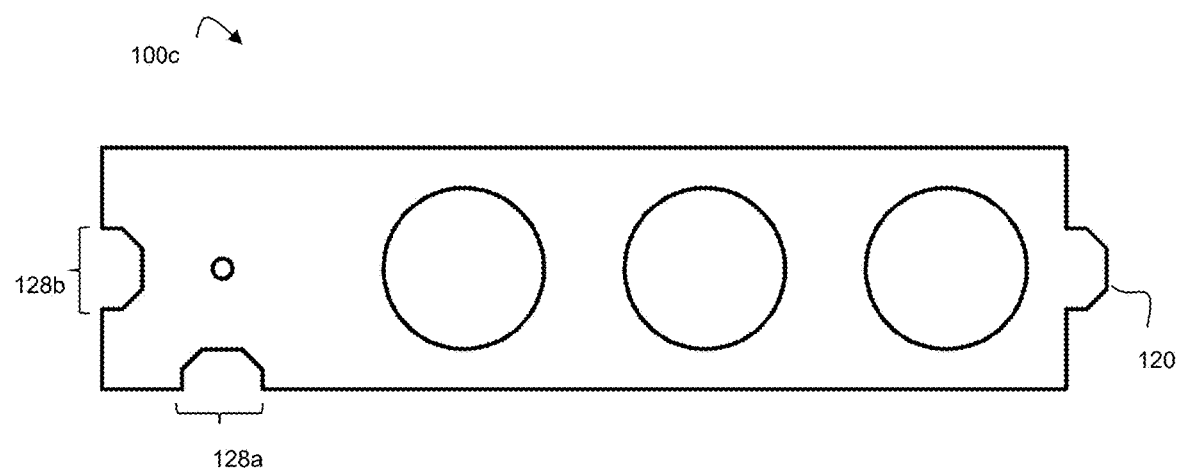
Figure 15:
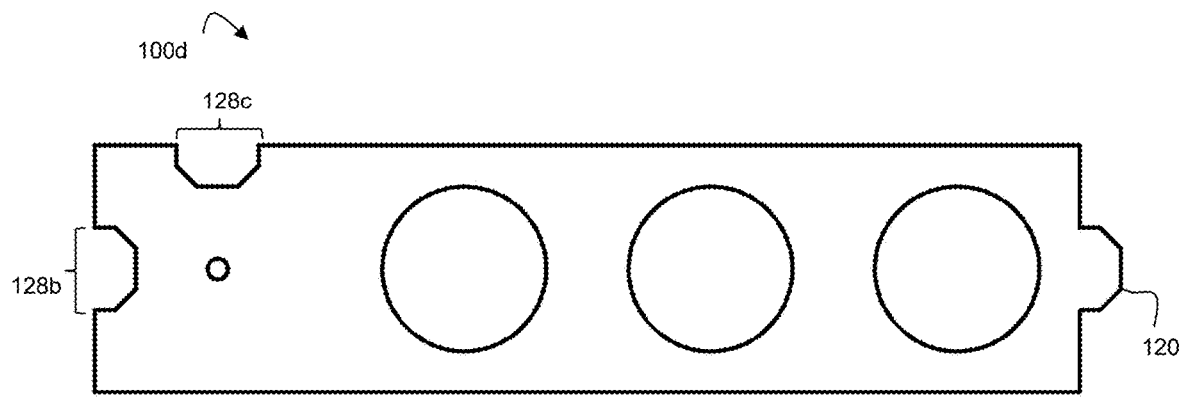
Figure 16:
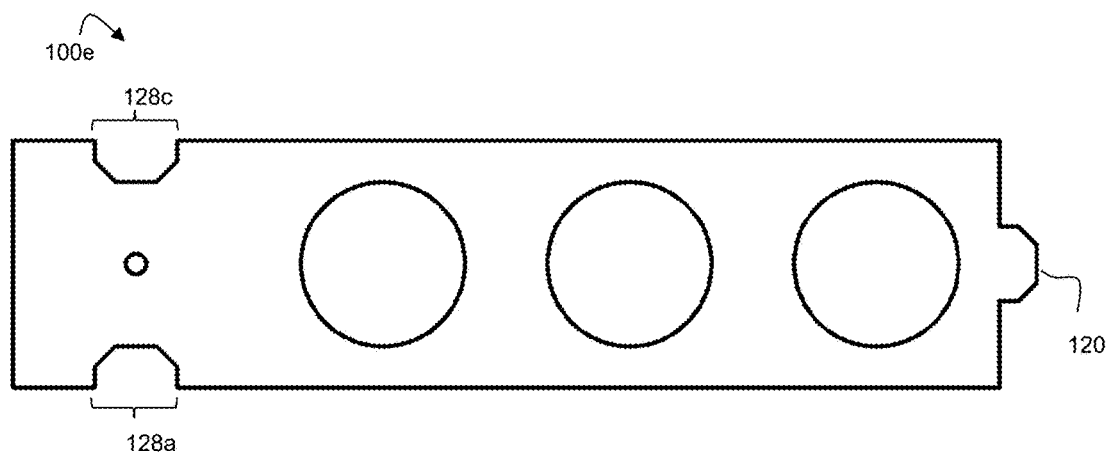

As shown in FIGS. 14, 15, and 16, the modular panel may comprise two female connection elements on each of: (iv) the second side 116 and a position proximal to the second side 116 on the front face 124, i.e., female connection elements 128b and 128a, respectively, as shown in FIG. 14 for modular panel 100c; (v) the second side 116 and a position proximal to the second side 116 on the back face 126, i.e., female connection elements 128b and 128c, respectively, as shown in FIG. 15 for modular panel 100d; or (vi) a position proximal to the second side 116 on the front face 124 and on the back face 126, i.e., female connection elements 128a and 128c, respectively, as shown in FIG. 16 for modular panel 100e.

Figure 12:
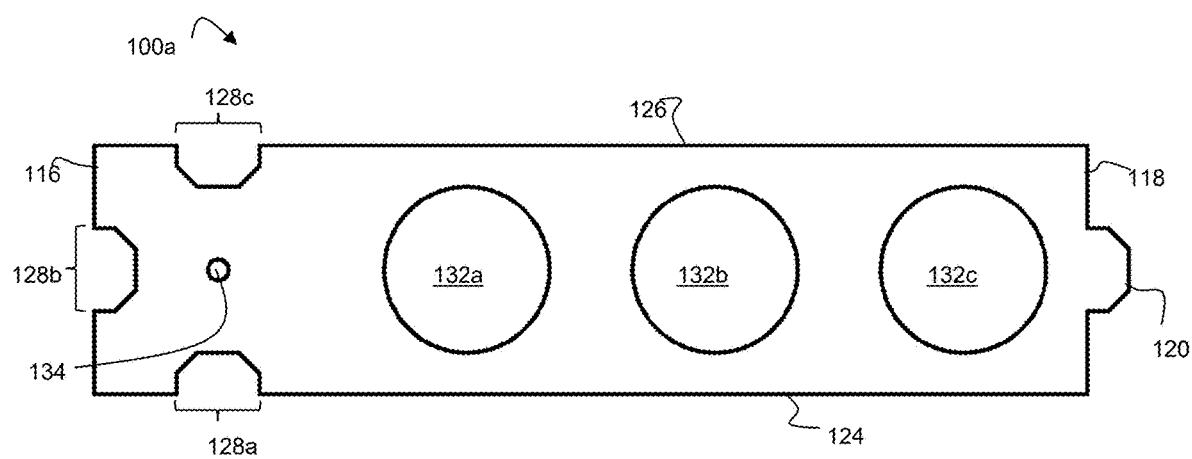
FIGS. 12-20 illustrate end views of various modular panel designs according to aspects of the present disclosure.

As shown in FIG. 12, the modular panel 100a may comprise a female connection element on all three of: (vii) the second side 116, a position proximal to the second side 116 on the front face 124, and a position proximal to the second side 116 on the back face 126, i.e., female connection elements 128b, 128a, and 128c, respectively.

Figure 21:
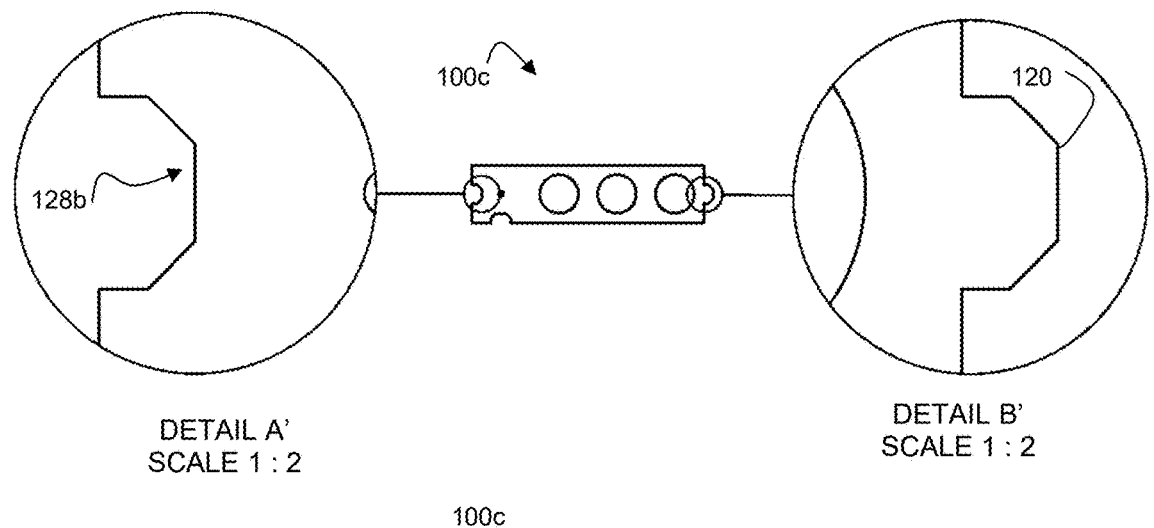
FIG. 21 illustrates close-up views of details of the connection portions of opposing sides of modular panels according to aspects of the present disclosure.

Close-up detail views of a male connection element 120 and a female connection element 128b are shown in FIG. 21 for modular panel 100c. The male connection element extends outward away from the first side 118 of the modular panel while the female connection element extends inward from the second side 116 (see FIG. 23A depicting a width of the modular panel 'b'). The male connection element of one modular panel is configured for snug connection with the female connection element (128a-c) on an adjacent modular panel. While a specific design is shown for each of these connection elements (120, 128a-c), other designs are possible and within the scope of the presently disclosed invention.

The various configurations of the modular panels shown in FIGS. 12-20 allow for connections between adjacent modular panels that provide a wide range of larger assemblies or arrangements, e.g., corners, tees, straight lines, crosses, etc.

Each of the modular panels also comprise at least one vertical bore 132 that passes from the top end 112 to the bottom end 114 through a length of the modular panel. The vertical bore is centrally position in the modular panel, such as equidistant from the front and back faces thereof (i.e., centrally positioned within a thickness of the modular panel as defined by 'c' of FIG. 23B). According to various aspects, the modular panels may comprise two, three, or more vertical bores. As shown in FIGS. 12-22, the modular panels may preferably comprise three vertical bores (132a-c) spaced apart from each other along the length of the modular panel (defined by 'b' in FIG. 11A).

Figure 24:
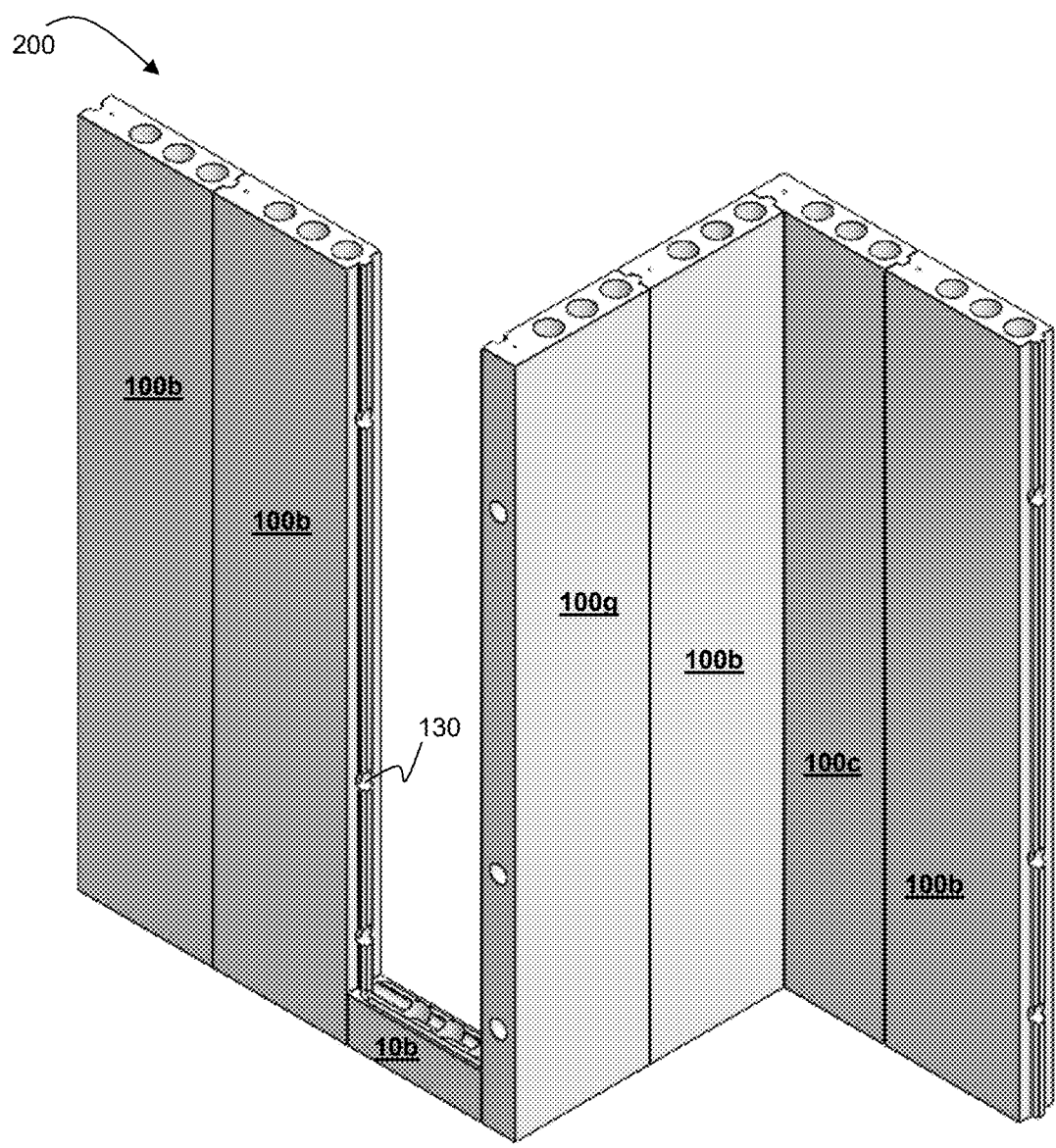
FIGS. 24-27 illustrate a group of modular panels configured as a wall or divider, wherein one region is populated with various numbers of modular blocks, such as one modular block (FIG. 24), two modular blocks (FIG. 25), 12 modular blocks (FIG. 26), and 15 modular blocks (FIG. 27).
Figure 25:
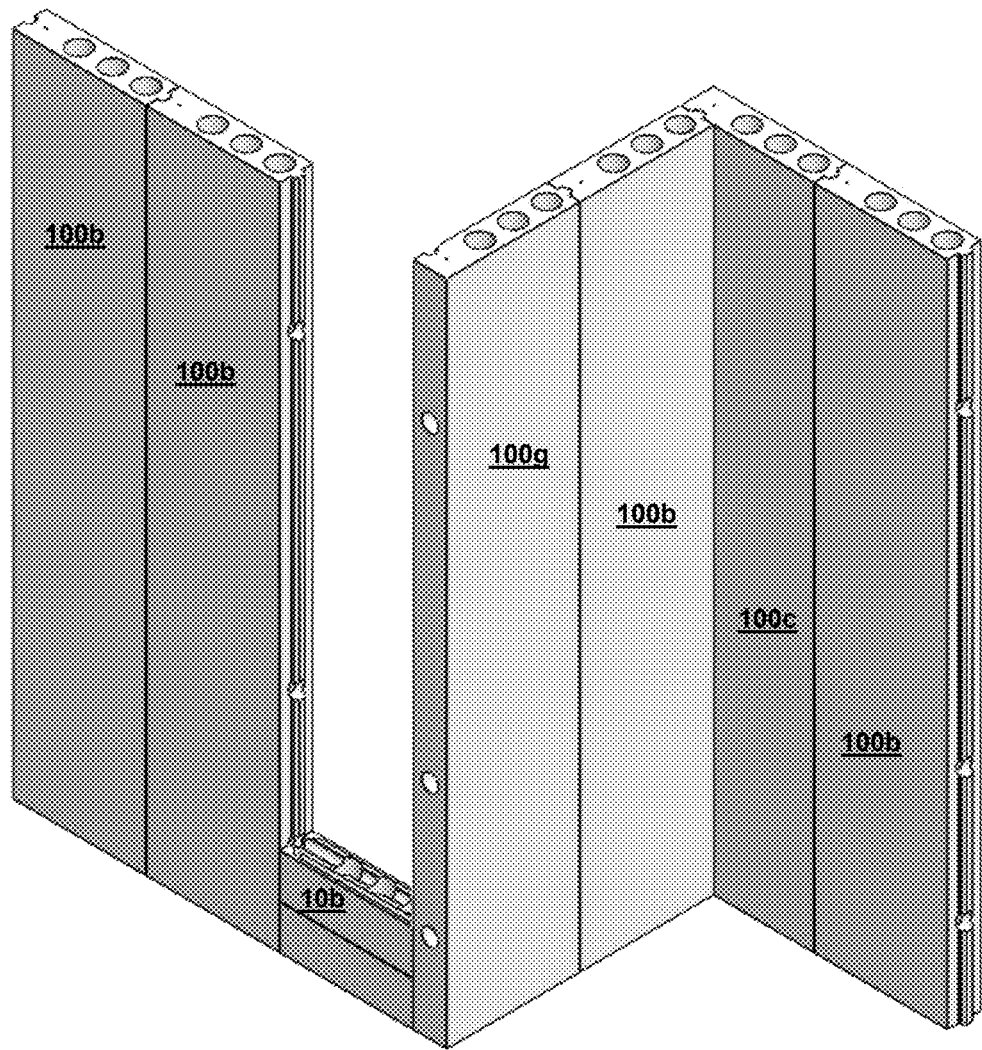
Figure 26:
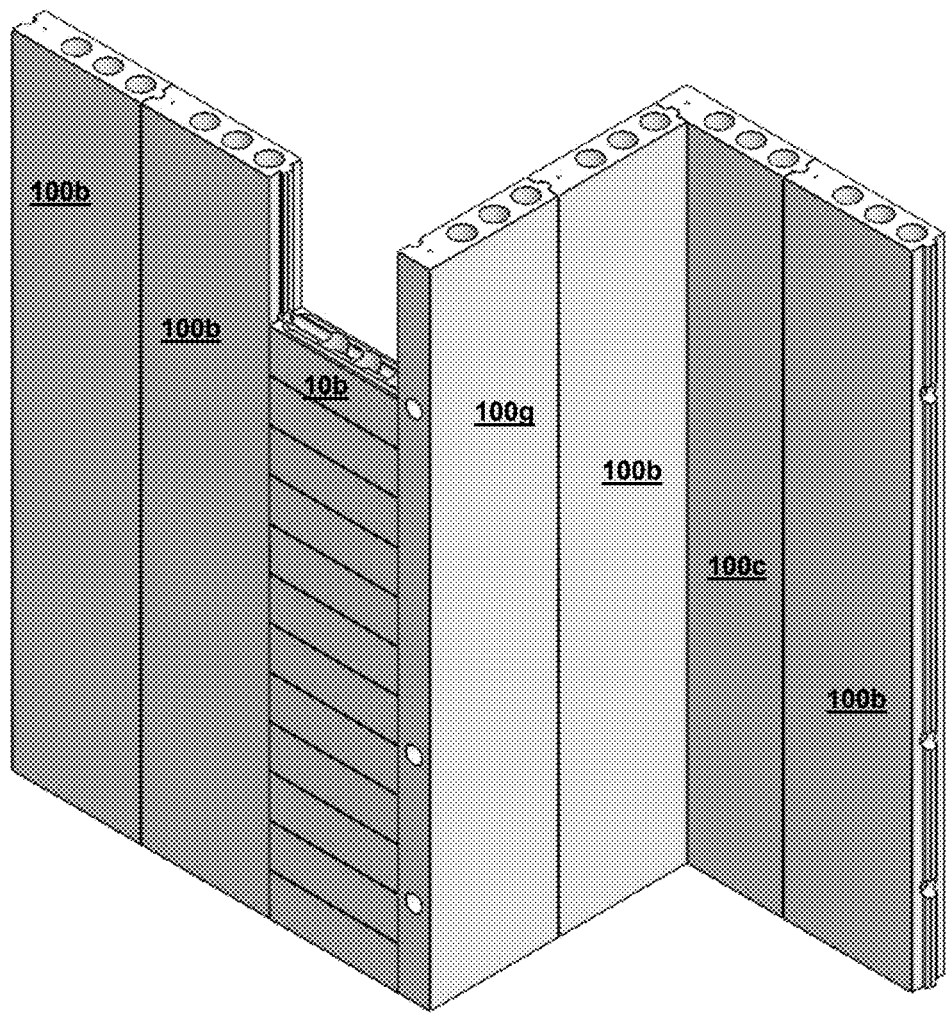

As shown in FIG. 24, the modular panels (100) may further include one or more horizontal bores 130 extending from a first side 118 to a second side 116 thereof. The horizontal bore 130 formed between adjacent blocks may intersect with the at least one vertical bore 132 forming a continuous channel extending both vertically and horizontally. Each of the vertical bores 132 and optional horizontal bores 130 may provide passage for conventional integration of plumbing components, electrical components, insulation components, or other types of components standard in residential and commercial construction (e.g., whole home vacuum, air purification, etc.).

Larger Structures and Assemblies

Figure 27:
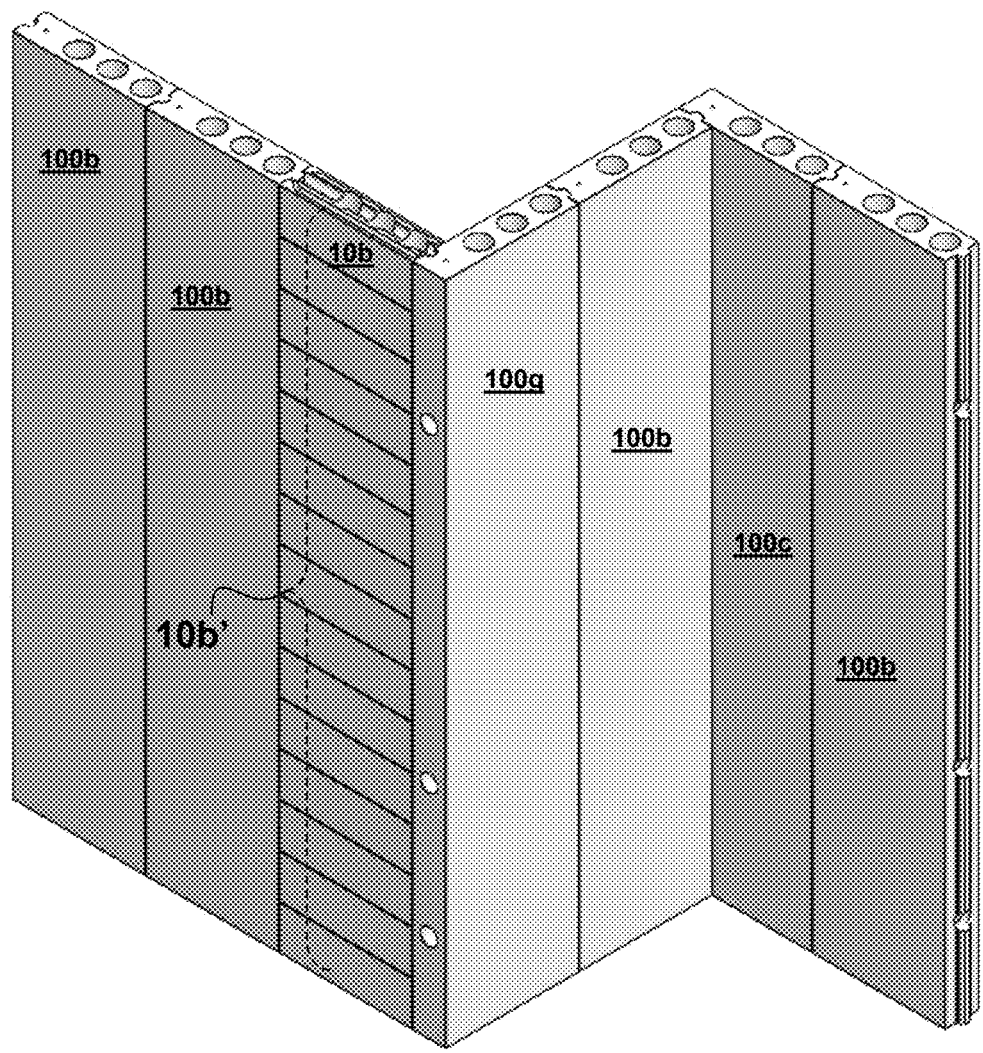
Figure 28:
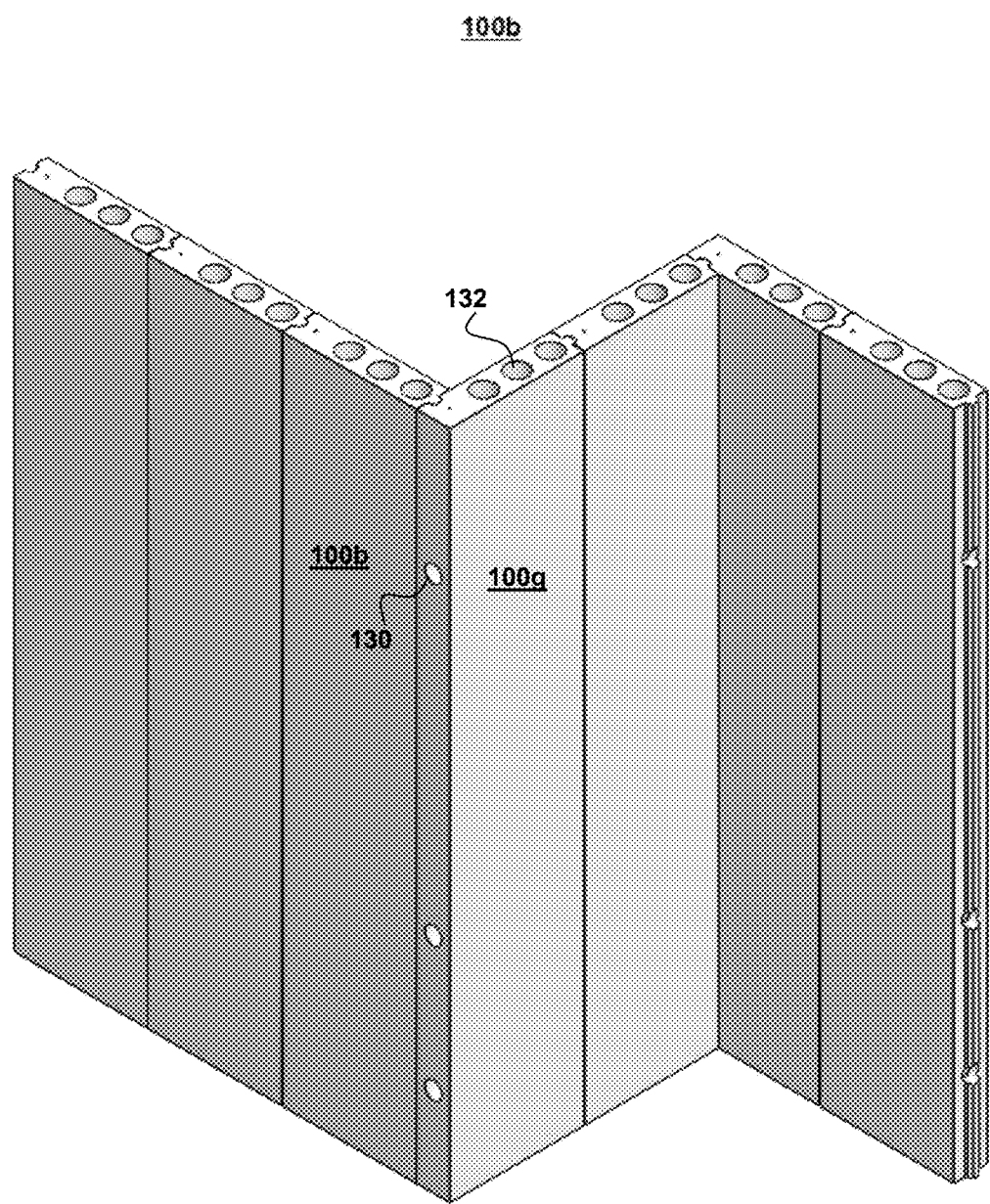
FIGS. 28 and 29 illustrate a group of modular panels configured as a wall or divider, wherein certain of the modular panels are shown to include horizontal channels (FIG. 28) or exclude horizontal channels (FIG. 29).
Figure 29:
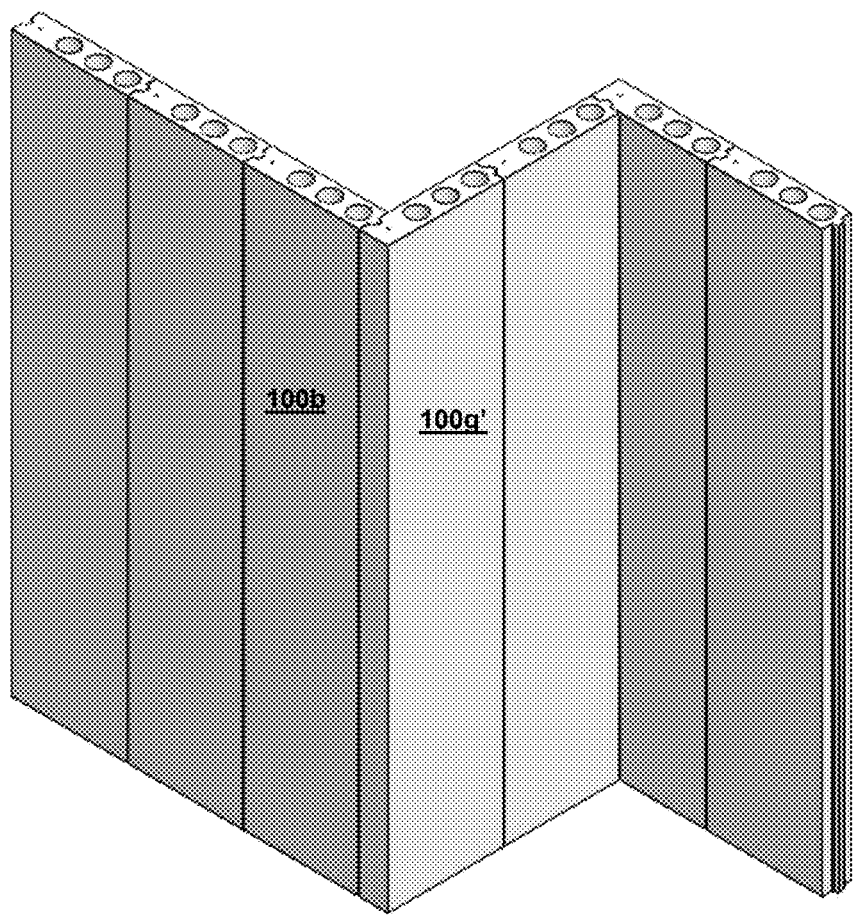

Larger structures and assemblies of the modular blocks and modular panels of the present disclosure are shown in FIGS. 24-30. As shown in the figures, various modular panels may be attached to form a wall, such as modular panels 100b that are shown to be connected to extend a length of the wall. Various other modular panel configurations may be connected to form a corner of the wall, such as modular panels 100b and 100c, or modular panels 100b and 100g that form oppositely oriented corners (100g' is the same as 110g absent the horizontal bore 130). Also shown in FIGS. 24-29 are various numbers of modular blocks included within a larger modular panel assembly. The blocks may be stacked to form a wall portion 10*b*' as shown in FIG. 27, or may be omitted in certain regions to form other portions of a building, such as openings for windows, doors, etc.

The modular panels and blocks are specifically configured so that various components may be included therein, i.e., have space for passage. For example, wiring or cables to provide fiber optic, electrical, internet, phone, and the like, may be passed through the horizontal (130) and/or vertical (132) bores. Moreover, piping for plumbing, and heating and cooling (e.g., in-floor, in-wall, in-ceiling, and/or in-roof heating and cooling elements such as circulated liquids, circulated air, or electrical coils and the like), may pass through the horizontal and/or vertical bores. The horizontal and/or vertical bores may also provide space/passage for reinforcement elements, such as poured concrete reinforcement, re-bar, all-thread fastening, or any combination thereof that may attach the foundation and/or roof trusses and/or ceiling modular panels, and the like. The horizontal and/or vertical bores may also provide space for insulation products or elements, such as blown-in insulation or various configurations of the hybrid construction materials disclosed herein (e.g., concrete with a high wt. % of the hybrid additive).

Figure 30:
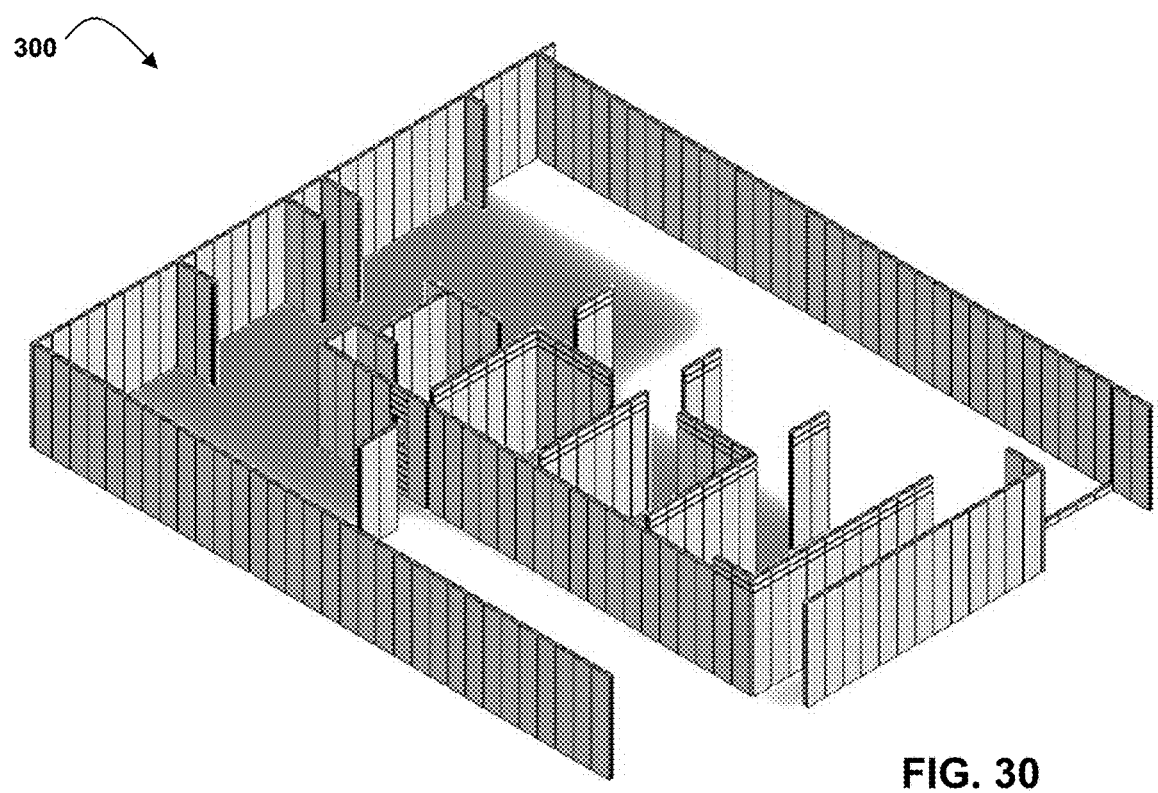
FIG. 30 illustrates a basic floor plan of a structure such as a house formed using the modular blocks and modular panels according to aspects of the present disclosure.

The modular panels and modular blocks may be combined to form larger assemblies such as walls, ceilings, floors, roofs, and the like. Various combinations of the modular panels and/or blocks may be provided as kits to form individual assemblies, such as walls, ceilings, floors, roofs, and the like. Combinations of kits may be used to form even larger assemblies, such as rooms, or entire structures. As indicated hereinabove, the larger assemblies may be configured as any type of building, storage structure or vessel, bridge, retaining wall, levee, aerospace structure, or high-rise structure. Shown in FIG. 30 is an exemplary floor plan 300 for a first floor of a building such as a house.

The modular blocks and modular panels may be coated, finished, painted, or laminated inside, outside, or both with layers of other materials for decorative, strengthening, or protective properties, or to provide additional insulation. Such coatings and the like may be applied to each modular block or modular panel individual, or when assembled into larger structure or assemblies of such structures.

Automated Design Software, Applications, and Methods

The present disclosure further provides software and digital applications that allow a user to design a structure, e.g., wall, retaining wall, floor, ceiling, room, and larger assemblies thereof, e.g., a home. The software and digital applications may be a downloadable to a user's device, such that they are executed by a processor of the device based on computer program instruction saved on a memory of the device. The software and digital applications may be web-based application(s) accessible by an electronic device, such as the user's device. As such, the processor and memory may be part of a remote server or device. The software and digital applications may include data and/or routines that are downloaded to the user's device and data and/or routines that are accessed from a remote server during execution of a method of the software. The software and digital applications may be used with or without an account setup.

The software may provide the user with preconfigured designs that they may alter to their specific tastes and needs, such as by adding rooms, adding additional levels, changing interior wall arrangements, increasing or decreasing wall heights and/or the number and/or size of windows and doors, and the like. Such preconfigured designs may be accessed from a database and may be stored to memory temporarily during a user's interaction with the design. The design may then be stored to a memory of a user's device and/or back to the database. The software may alternatively or additionally provide the user with the ability to design a structure de novo, to save designs, and to alter saved designs at a later time.

The software may allow the user to select dimensions for spaces within an assembly, such as height, length, and width of a room, wherein the selection is open (user selectable) or based on standardized sizes of the modular blocks and modular panels. As such, various sizes of blocks may be included in a design to attain dimensions as close to an open user selection as possible. The software may also provide virtual modular blocks and modular panels (e.g., virtual Legos®) that a user may employ to build structures and assemblies thereof. In each case, the user may select the combinations of modular blocks and modular panels they prefer, or the software may provide a design based on a best configuration of the modular blocks and modular panels (e.g., based on strength of the blocks/panels, size of the structures and assemblies, positions of electrical and plumbing systems and components, positions of windows, and the like). The user may save and/or modify the design provided by the software.

In some scenarios, a used may create a physical scale model of a design using real modular blocks and modular panels. As such, the use may interact with the software to select a general expected size of the assembly or structure, and the software may calculate a number of non-virtual modular blocks and modular panels to provide to the user so that they may build the scale model. The software may also be configured to recreate a virtual design based on the physical design from images of the physical design.

Further, due to the novel connection elements of the modular blocks and modular panels discussed hereinabove, the user may plan for future additions to the designed structure, such as based on cost and/or family planning. For example, the user may design the structure with connection elements available for room additions.

As used herein, the term "user" shall be understood to include individual designers (future owners of the designed home, store, shed, or any other building type), builders, architects, construction crews, and the like.

The software, applications, and methods may convert the final user designs, such as graphically designed structures or virtual designs created from physical models, to design drawings of a quality useful to a builder. Moreover, the software, applications, and methods may provide lists of materials, inclusive of the modular blocks and modular panels and any additional components that may be provided as a kit, i.e., "housekit". The kits may be shipped to the building site and, due to the novel connection elements of the modular blocks and modular panels discussed hereinabove, the designed structure may be built with greater speed and efficiency than offered by previous building supplies and methods.

As indicated, a kit may include not only the modular blocks and modular panels needed to execute a design, but also connection elements, fasteners for a foundation, trusses, window and door frames and/or headers, roofing tiles or panels, pavers, sidewalk panels, etc. These components may be formed of the novel composite construction materials disclosed herein or other materials known in the art such as wood, cement, concrete, stone, steel, and the like. These components may also be uniquely designed and configured to fit with the modular blocks and modular panels disclosed herein. Additional components such as windows, doors, handles, cabinetry, etc. may also be included in a kit.

Moreover, the software, applications, and methods provide lists of materials needed to build the designed structures to the manufacturer so that manufacture of the modular blocks and modular panels is optimized. That is, excess supply need not be housed and maintained as only the amounts needed for a project would be manufactured on demand. As such, the software may include a logistics engine that may optimize scheduling of the manufacture and shipping of the kit, or the user selected components (e.g., modular blocks and modular panels, etc.).

For example, the user may design a structure or assembly using the software. The user may then finalize the design and the software may convert the final user designs to design drawings, i.e., blueprints, of a quality useful to a builder. The software may further provide lists of materials needed to execute the design. Any user associated with the design (individual designers, builders, architects, etc.) may order the materials needed to execute the design, provide a desired start date of construction, and a location for shipment. The logistics engine may aid in optimizing timing of manufacture and shipping/delivery of these materials. When materials are sourced from more than one location, manufacturer, or seller, the logistics engine may coordinate with each of these sources to time manufacture and/or shipping/delivery of the materials.

As such, the software application may be configured to schedule manufacture of all or some of the components at a time close to the selected delivery date of the materials. The logistics engine may coordinate manufacture of orders from more than one user to ensure that all orders are timely manufactured. The logistics engine may further coordinate with various sipping companies to coordinate pickup, shipping, and delivery of the materials. In most construction projects, not all of the materials are needed at once. Thus, the logistics engine may additionally schedule manufacture and shipping/delivery of subsets of the materials for a project so that materials not yet needed for a project are not delivered, i.e., reduce space needed on a construction site to store materials, possible damage to the stored materials, etc.

The software application may be further configured to provide notifications to the user and manufacturer regarding shipping details, i.e., time of pick-up and delivery, and issues with shipping, and the like. Thus, the software may send a first request to a first shipper to pick up the materials and deliver them to the user selected location. The user may elect to be updated on a status of their order (i.e., estimated delivery date and time, and/or updates on a current location of the materials). Accordingly, the software application may further receive a notification from the first shipper that the materials are at a first location (i.e., expected location), and send a second message to the user device, wherein the second message confirms or updates delivery details of the materials (i.e., date, time, updates, tracking number, pickup and delivery notifications, and the like).

Hybrid Construction Materials

Also disclosed herein are hybrid construction materials, or "hybrid composites", useful for forming the modular blocks and modular panels. The hybrid composites generally comprise an aggregate, a binder, a hybrid additive, and optionally, additional additives. The dry components are introduced through a unique dry process during production of the hybrid composite, wherein the dry components including the aggregate, binder, and hybrid additive are blended to produce the hybrid composite material.

Exemplary aggregates include naturally occurring or manufactured aggregate, sand, screenings, dust, or aggregates known to be used in construction materials by those skilled in the art.

Exemplary binders include Portland cement, supplementary cementitious materials, hydrated lime, calcium carbonate, epoxies, clays, including virgin or recycled/reclaimed sources or both, in dry, slurry, emulsion, liquid, or gaseous form. Further exemplary binders include concrete products, glass, natural and synthetic rubber, and/or wood. Each of the binders disclosed herein may include virgin sourced materials, recycled/reclaimed materials, or a combination of both.

According to certain aspects, the hybrid composite may comprise aggregate; cement; secondary cementitious materials, such as fly ash, bottom ash, pozzolans, silica fume, and calcined clays; the hybrid additive; and water.

The hybrid additive may comprise a blend of structural polymers that may be coated with cementitious materials such as calcium carbonate, pozzolanic materials such as siliceous and calcareous fly ashes, natural and industrial pozzolans, metakaolin and silica fume; graphene; carbon nanotubes; and the like. For example, the hybrid additive may be provided as a pellet. The surface of the pellet may be intentionally textured to increase the surface macro- and micro-textures, and thereby the bonding of the hybrid additive with the cement matrix that develops within the hybrid composite. Furthermore, the pelletized hybrid additive may contain dimples, indentations, inclusions on the surface thereof, and these indentations may contain any one or more of a cementitious material, pozzolanic material, or other material as listed hereinabove. The additional material may promote bonding between the hybrid additive pellet and the cement paste.

A primary strength of the hybrid composite may be developed through the pozzolanic reaction. The structural polymers of the hybrid additive may provide additional strength through increased cementitious material, e.g., coated on the surface of the pellets and/or trapped within dimples, indentations, and inclusions in the surface of the pellet. Additionally, the surface of the hybrid additive pellet is essentially sealed and does not absorb moisture during the curing process, and thus may improve the long-term hydration reaction at the pellet-cement matrix interface. In addition, the blend of structural polymers of the hybrid additive may include fibers (e.g., aramid, steel, cellulose, hemp, and carpet fibers) and glass in a variety of forms (e.g., pelletized, crushed, and powdered), to improve the strength and cracking resistance of concrete mixtures. The fibers may be incorporated into the blend during production of the hybrid additive in a pelletized form. Incorporating the fibers into the pellet improves material handling of fibers because the pellets have sufficient density that they can be easily introduced into the composite mixture without blowing away.

Another benefit of fibers contained in a hybrid additive that can be easily mixed into and dispersed within a cement composite mixture is the dispersed fibers strengthen and create additional bonds between the interface of the hybrid additive pellets and the cement matrix. These additional bonds may improve the cracking resistance and strength of the concrete composite.

The modular blocks and modular panels of the present disclosure may be manufactured and formed using the hybrid composite. The modular blocks and modular panels may be formed into the disclosed shapes by known manufacturing methods including but not limited to heating, molding, extruding, rolling, stamping, casting, machining, water-jet or laser cutting, additive manufacturing, or other manufacturing processes. The modular blocks and modular panels can be pre-formed in a manufacturing facility, on-site, or in-situ.

In addition to the modular block and modular panels disclosed herein, the hybrid composite can be formed on-site or prefabricated into beams, frames, conduits, pipes, doors, piers, footings, pilings, floors, flooring, tiles, shingles, pavers, trusses, retaining wall blocks, and the like. The hybrid composite can be applied to or inserted between other surfaces using techniques such as spraying, troweling, texturing, stuccoing, mud jacking, and grouting in vertical construction and geotechnical applications to achieve one or more of the following purposes: coat, texture, decorate, waterproof, finish, and/or fill. This application of the hybrid composite increases speed of construction and reduces the labor required for these applications.

The disclosed hybrid composites are unique when compared with other known construction materials because they demonstrate significant improvements in all aspects of standard construction material performance. For example, bonding of mixture components, rutting/denting/deformation resistance, cracking resistance, and moisture resistance are all improved for the presently disclosed hybrid composites when compared to standard materials.

Hybrid Additive

The disclosed hybrid additives generally comprise polymers from virgin and/or recycled sources. Exemplary polymers include any thermoplastic, thermosetting plastics, and elastomers. Exemplary polymers include, but are not limited to, polyolefins such as polyethylene, which includes, among others, polyethylene (PE), ultra-high molecular weight polyethylene, ultra-low molecular weight polyethylene, high molecular weight polyethylene, high density polyethylene (HDPE), high density cross-linked polyethylene, cross-linked polyethylene, medium-density polyethylene, linear low density polyethylene (LLDPE), low density polyethylene (LDPE), very low density polyethylene, chlorinated polyethylene. Exemplary polymers further include, but are not limited to, polypropylene, polystyrene and copolymers thereof, polyurethanes, polyesters, polyvinyls such as polyvinyl chloride, polytetrafluoroethylene, or other recycled or virgin polymers. The polymeric material may be in a compacted, heat-treated, or gas-expanded form. Gas-expanded or expanded polymeric materials are filled with air, $CO_2$ (including recovered $CO_2$), gases, and the like. Use of such materials in the hybrid additive of the hybrid composites used to form the blocks and modular panels herein leads to a lighter weight of the block/modular panels, a higher insulation/R factor, enables larger aggregate sizes without increased weight, decreases the cost of the additive, and allows a higher percentage of recycled waste per unit volume.

According to certain aspects, the hybrid additive may comprise an olefin such as polyethylene and/or polypropylene. For example, the hybrid additive may comprise 0-100% polyethylene, such as 50-95% polyethylene.

The disclosed hybrid additives are unique in that they are structurally different from other known construction materials and additives. More specifically, the form and/or shape of the hybrid additive may be configured to make addition of the additive easier during production of hybrid composites, such as production of a hybrid composite at a cement/concrete plant. The shape of the additive may be configured to allow the additive to be transported easily by different conveyance systems such as pneumatic, pressurized or vacuum, mechanical conveyance systems such as linear continuous conveyances (e.g., belts or augers) or discrete quantity conveyances (e.g., hopper or bucket), or typical mobile mechanized equipment available at asphalt or concrete plants such as front-end loaders, dump trucks, bucket trucks, cranes, forked lifts, and scissor lifts, that are used for transporting aggregates and other bulk goods, such as hydrated lime, cement, and fibers, around an asphalt plant or sand, gravel and cement components at a concrete plant.

In one exemplary implementation, the form of the hybrid additive is roughly cylindrical with a slight curvature at the ends to increase the rolling resistance of the pellet, yet still allow the pellets to flow into/out of bulk quantities. The length of the pellet may be 0.125 inches to 0.5 inches (3 to 13 mm), such as 0.15-0.45 inches, or 0.2-0.4 inches, or 0.2-0.3 inches, or about 0.25 inches (6 mm). The diameter of the pellet may be 0.0625 inches to 0.5 inches (1.5 to 13 mm), such as 0.1-0.4 inches, or 0.125-0.35 inches, or 0.15-0.25 inches, or about 0.188 inch (5 mm). The curvature at the ends of the pellet may be from 1° to 45°, relative to a longitudinal axis of the pellet, such as from 1°-30°, or from 1°-20°, or from 1°-15°, or from 1°-10°. The curvature at each end of the pellet may be in the same direction or may be a deflection from the longitudinal axis in any axial direction. Furthermore, the sizing may be consistent within 10% of the nominal dimension, and ideally within 5%, which improves the flowability of the additive. The surface texture of the hybrid additive is typically smooth but can be adjusted in the manufacturing process to improve the movement of the material.

In another exemplary implementation, the form of the hybrid additive is powderized using any means of reducing the size of the material such as, but not limited to, rolling ball mills, cryogenic mills, crushing, shearing, and/or blowing air into the fabrication. When powderized, a diameter of the hybrid additive may be from about 5 micrometers (um) to 250 um, such as 5-200 um, or 10-150 um, or 25-125 um.

In another exemplary implementation, the form of the hybrid additive is sand-like, having a diameter of greater than 250 micrometers (um) up to about 2.5 mm, such as 0.5 mm-2.0 mm.

In another exemplary implementation, the form of the hybrid additive is gravel-like, having a diameter of greater than 2.5 mm up to about 50 mm, such as 2.5 mm-25 mm.

In another exemplary implementation, the hybrid additive is formed into a non-cylindrical shape, i.e., pellet, with a length and/or diameter of 1/16 to 2 inch (1.6 to 50 mm), such as 2 mm to 25 mm. In another exemplary implementation, the hybrid additive is formed into a roughly spherical shape, i.e., bead, with a nominal diameter ranging from 1/16 to 2 inch (1.6 to 50 mm) with preferential sizes of nominally about 3/16 inch (4.8 mm), 3/8 inch (9.5 mm), and 1/2 inch (13 mm), which has a high crush strength due to its geometry. For example, the nominal diameter of the spherical hybrid additive may be 1-20 mm, such as 1-15 mm, or 3-15 mm, or 4-13 mm. The bead or pellet may be filled with air or other additives to improve the composite mixture and may or may not have a coating on the outside thereof. That is, the hybrid additive may be modified by utilizing foaming processes or agents to lighten the additive and to introduce properties that enable production of lightweight concrete and concrete products with insulative properties, or other construction material applications that provide economic or usability benefits from light weight such as high-rise buildings, concrete housing, infrastructure components such as bridge beams, lightweight roof tiles, blocks, modular panels, pavers, poured cement, and other lightweight concrete or construction materials.

The surface of the hybrid additive, such as when provided as a bead or pellet, may be textured to increase the surface macro- and micro-textures, and thereby the bonding of the hybrid additive with components of the construction matrix (i.e., components of a composite material disclosed herein). Texture may include indentations, dimples, inclusions, and the like.

The hybrid additive may further include coatings, such as with cementitious material that includes calcium carbonate, hydrated lime, graphene, carbon nanotubes, and pozzolanic materials. These materials may be included at from 0 wt. % to 50 wt. % of the total weight of the pellet, such as at least 0.1, 0.5, 1, 2, 3, 4, 5, 6, 7, 8, 9, 10 wt. %, or up to 20, 25, 30, 35, 40, 45, or 50 wt. %, based on the total weight of the pellet. The coatings may be included on an external surface of the pellet in a range comprising any combination of lower and upper limits indicated herein, such as from 0 wt. % to 40 wt. %, or from 0.1 wt. % to 20 wt. %, or 0.1 wt. % to 30 wt. %, or from 0.1 wt. % to 5 wt. %, etc.

The hybrid additive may further include additional components incorporated into the pelletized or spherical structure, such as fibers, pozzolans, nano-carbon tubes, glass, recycled asphalt shingles (RAS), liquid anti-strip, calcium carbonate, hydrated lime, graphene, rejuvenators, cementitious material, and ground tire rubber. These materials may be included at from 1 wt. % to 100 wt. % of the total weight of the pellet, such as at least 1, 2, 3, 4, 5, 6, 7, 8, 9, 10 wt. %, or up to 20, 25, 30, 35, 40, 45, or 50 wt. %, based on the total weight of the pellet. The additional materials may be coated on the pellet or included in the pellet in a range comprising any combination of lower and upper limits indicated herein, such as from 0 wt. % to 40 wt. %, or from 0.1 wt. % to 20 wt. %, or 0.1 wt. % to 30 wt. %, or from 0.1 wt. % to 5 wt. %, etc.

The hybrid additives may improve the bonding within a cement mixture by improving the bonding between the aggregate and cement paste. The spherical pellets may have a texture that increases the surface area and increases the wettability of the pellets that allows the development of a strong interface between the additive and cement paste.

The hybrid additives are unique in that they may be added in a dry mix process to produce the hybrid composite. This ability gives the material producer greater control over the product produced and allows more precisely engineered materials because the hybrid additive dosage can be varied to meet the strength and deformation, cracking, and moisture resistance requirements of the mixture without negatively influencing other desirable mixture performance.

The hybrid additives disclosed herein have been found to exhibit linear effects on performance characteristics.

The hybrid additive may be included in the cementitious material forming the modular blocks and/or modular panels in amounts as low as 1 wt. % up to 80 wt. %, based on the total weight of the modular block or modular panel. Accordingly, the presently disclosed hybrid additives provide an economical and in many cases cost-savings while minimizing the volume of material needed to achieve the target performance. This can allow the user to eliminate other additives and to utilize lower-grade, lower cost materials to achieve desired performance such as lower cost aggregates and cement ingredients in concrete—allowing higher profits to the producer and lower costs to the user for equivalent or higher performance compared to alternative materials or additives.

While the hybrid additives provide performance improvements at low usage amounts, the hybrid additive also provides significant improvements in hybrid composites at high volume amounts. That is, the hybrid additive may be included in hybrid composites as an additive and/or as a replacement for aggregate materials at from 0.01% to 100% by weight of volume without decreasing the strength of the construction material. As the percentage of aggregate replacement increases, the unit weight of the composite material decreases, which is beneficial for reducing the weight and thereby the supporting elements for a structure formed with the hybrid composite.

Accordingly, the hybrid additive may be included in the hybrid composites (i.e., hybrid construction materials) used to form the modular blocks, modular panels, and other elements disclosed herein in amounts of at least 5 wt. %, or at least 10 wt. %, or at least 20 wt. %, or at least 30 wt. %, or at least 40 wt. %, or at least 50 wt. % of the hybrid additive, wherein the wt. % is based on a total weight of the hybrid construction material. The hybrid additive may be included in the hybrid composites in amounts less than 80 wt. %, or less than 70 wt. %, or less than 60 wt. %, or less than 50 wt. %, or less than 40 wt. %, or less than 30 wt. % of the hybrid additive, wherein the wt. % is based on a total weight of the hybrid construction material. Any combination of upper and lower wt. % of the hybrid additive are possible and within the scope of the present disclosure. For example, 5 wt. % to 60 wt. %, or 10 wt. % to 60 wt. % of the hybrid additive may be included in the hybrid construction material.

This disclosure will now provide a more detailed and specific description that will refer to the accompanying experimental examples. The drawings and specific descriptions of the drawings, as well as any specific or alternative embodiments discussed, are intended to be read in conjunction with the entirety of this disclosure. The hybrid additives and hybrid composites comprising the disclosed additives exhibit performance gains in an asphalt and concrete mix examples. The invention may, however, be embodied in many different forms such as lumber and other applications and should not be construed as being limited to the embodiments set forth herein; rather, these embodiments are provided by way of illustration only and so that this disclosure will be thorough, complete, and fully convey understanding to those skilled in the art.

EXAMPLES

Example: Concrete Composites Comprising a Hybrid Additive

Figure 31:
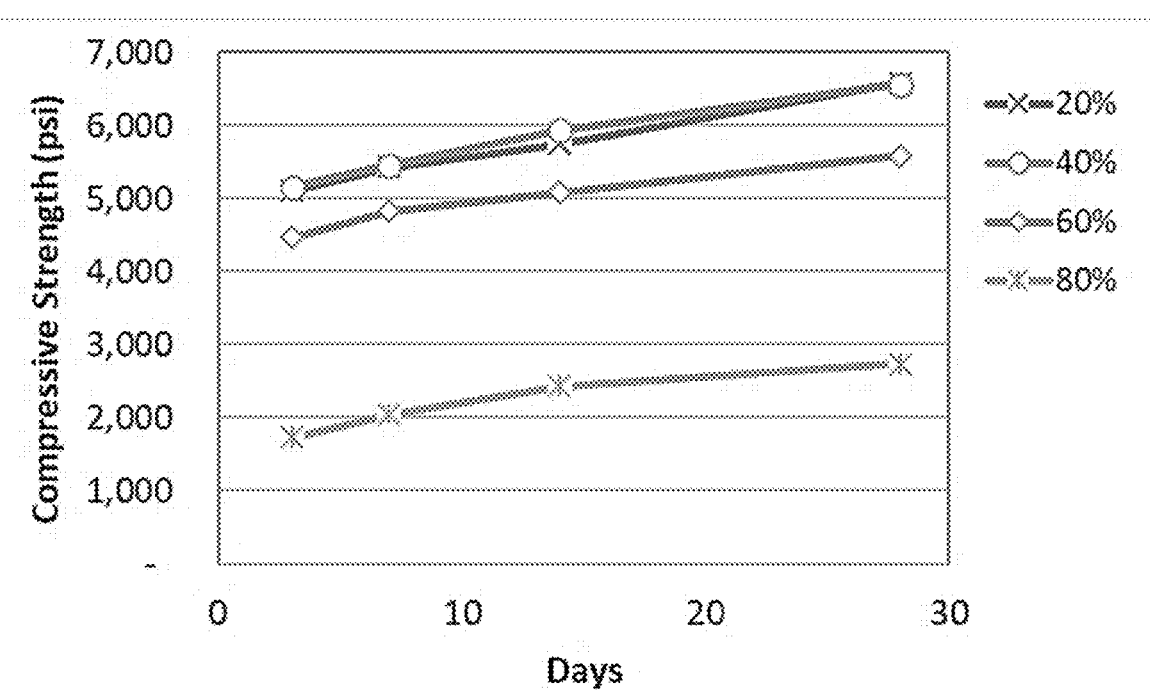
FIG. 31 is a graph showing compressive strength over time for hybrid composites formed with different quantities of aggregate replacement with a hybrid additive according to the present disclosure when mixed with typical quantity of Portland cement (590 lbs./cy).

A hybrid concrete composite was formed comprising varied amounts of the hybrid additive disclosed herein. In FIG. 31, the compressive strength results for a hybrid composite formed with a Portland cement binder and different quantities of hybrid additive as aggregate replacement are shown. The quantities (volumes) of cement and water did not change during this testing. The aggregates were replaced by hybrid additive at different amounts (% of total volume of aggregates) such that the total aggregate/hybrid additive remained constant (i.e., mimicking an unchanged amount of aggregate).

Figure 32:
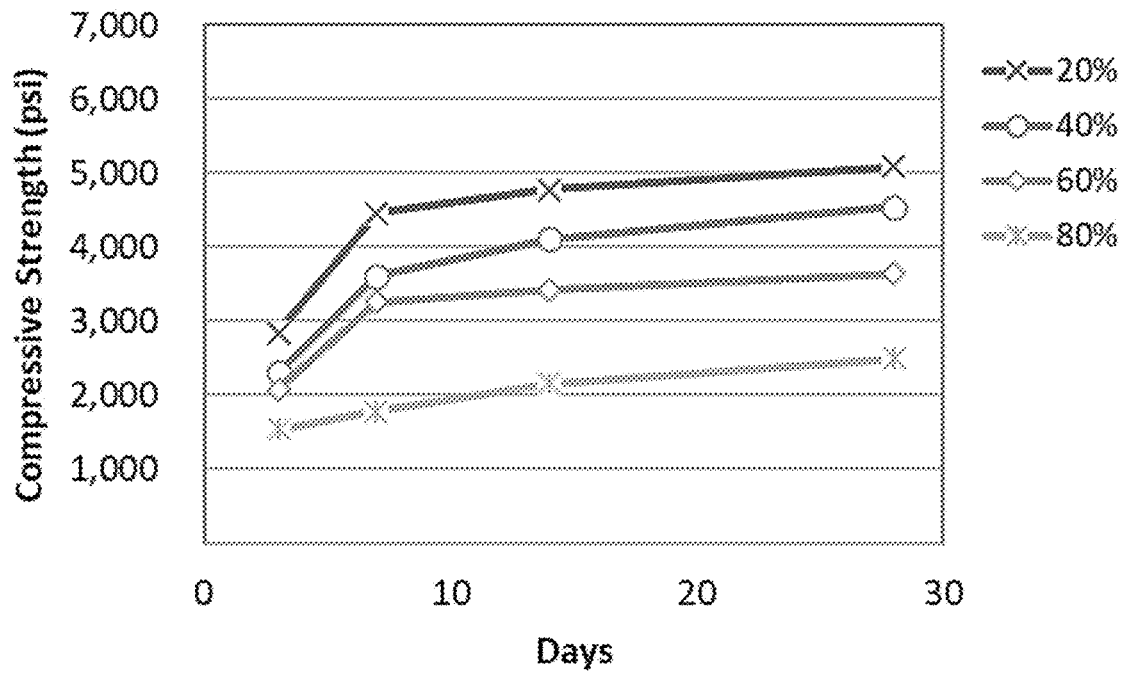
FIG. 32 is a graph showing compressive strength over time for hybrid composites formed with different quantities of aggregate replacement with a hybrid additive according to the present disclosure when mixed with reduced quantity of Portland cement (540 lbs./cy).
Figure 33:
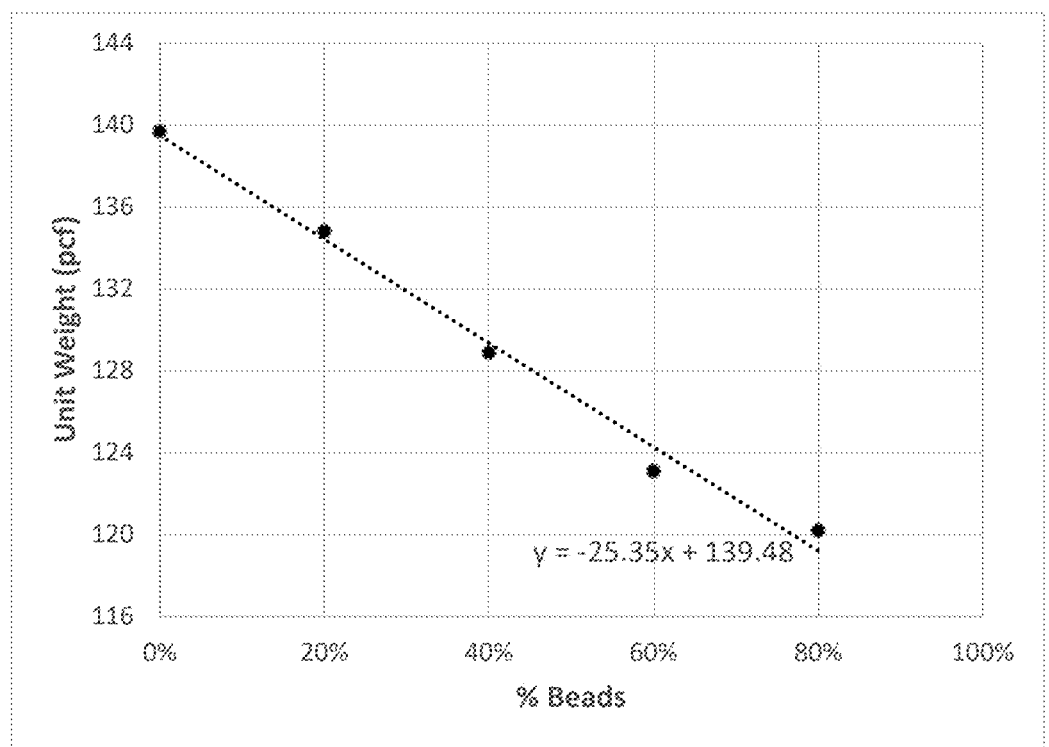
FIG. 33 is a graph showing the unit weight for hybrid composites formed with different quantities of aggregate replacement with a hybrid additive according to the present disclosure.

The results in FIG. 32 show that the hybrid additive provides a strong structure for the cement matrix to develop high strength, i.e., greater than 6,000 psi at 28 days, which is classified as high-strength concrete. The strength was high for 20% and 40% replacement by volume of all aggregates (sand and rock). A slight decrease in strength occurred at 60% replacement. At 80%, the strength was reduced to approximately 3,000 psi at 28 days, which is still acceptable strength for many applications such as sidewalks, wall modular panels, and cement blocks. Since the structural polymers have a lower density than aggregates, the overall density of the concrete decreases as the % volume of hybrid additive increases. Lighter concrete has many applications such as floors in buildings, wall modular panels, concrete blocks, and geotechnical applications. The reduction in weight, i.e., pounds per cubic foot (pcf), for the hybrid composites having various amounts of the aggregate replaced with hybrid additive is shown in FIG. 33 (e.g., same hybrid composites shown in FIG. 31).

In FIG. 32, the compressive strength results for a hybrid concrete composite comprising a Portland cement binder and varied amounts of the hybrid additive as aggregate replacement are shown. The difference between FIGS. 31 and 32 is the quantity of cement was reduced from 590 pounds to 540 pounds per cubic yard of concrete. This reduction in cement makes the construction composite material more economical and sustainable due to the use of less Portland cement and more recycled structural polymers. The results show that the structural polymers provide a strong structure for the cement matrix to develop high strength even with a reduced quantity of cement. The strength for 20% and 40% replacement was greater than 4,000 psi, which is a common strength requirement for Portland cement concrete. The mixtures in these tests developed most of their ultimate 28-day strengths by 7 days, which is desirable in tight construction schedules.

Results of chemical and mechanical wearing tests of expanded hybrid additives used in hybrid concrete composites are shown in Table 1. The results show that the hybrid additives prevent common issues in aggregates used in PCC due to exposure to different mineral salts, magnesium chloride and sodium chloride. The results show that the percent loss is less than 1.0%, which is well below the specification of less than 15% loss for both magnesium and sodium sulfate testing. The hybrid additives replace the aggregates and prevent the adverse reactions that occur between the mineral salts and the aggregates.

Furthermore, the hybrid additives are resilient, which is shown by the Los Angeles Abrasion test results in Table 1. The L.A. Abrasion test is an aggressive test to measure aggregate durability to abrasion of steel balls mixed with the aggregate in a container, i.e., a rotating steel drum steel fitted with an internal shelf that lifts and drops the steel balls and sample with each revolution, generating impact forces. The results show the % wear, which is a percentage of the material worn away, is approximately 1%, which is much less than the limit of 40% loss for typical aggregates.

TABLE 1

| Sample ID | Magnesium Sulfate Percent Loss, % | Sodium Sulfate Percent Loss, % | L.A. Abrasion Percent Wear, % |
| --- | --- | --- | --- |
| 15 | 0.1 | 0.8 | 1.1 |
| 13 | 0.2 | 0.6 | 1.1 |
| 08 | 0.2 | 0.5 | 1.3 |
| 07 | 0.1 | 0.5 | 1.2 |
| Specification | <15.0% Loss | <10.0% Loss | <40.0% Loss |

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

LISTING OF REFERENCE NUMBERS 10a-10i modular blocks
12 top side of modular block
14 bottom side of modular block
16 second end of modular block
18 first end of modular block
20, 20a, 20b male connection element(s) of modular blocks
24 front face of modular block
26 back face of modular block
28a-28c female connection element(s) of modular blocks
a height of modular block
b length of modular block
c width of modular block
30 horizontal bore in connected modular blocks
32a-32c vertical bore(s) in modular block
34 central point on the top/bottom sides of the modular block
40 second horizontal channel on bottom side of modular block
42a outer horizontal shelf adjacent front face on bottom side
42b outer horizontal shelf adjacent back face on bottom side
43a inwardly sloped region between 42a and 44a
43b inwardly sloped region between 42b and 44b
44a inner horizontal shelf adjacent inwardly sloped region 43a
44b inner horizontal shelf adjacent inwardly sloped region 43b
45 semicircular recess on bottom side of modular block
50 first horizontal channel in modular block
52a outer horizontal shelf adjacent front face on top side
52b outer horizontal shelf adjacent back face on top side
53a outwardly sloped region between 52a and 54a
53b outwardly sloped region between 52b and 54b
54a inner horizontal shelf adjacent outwardly sloped region 53a
54b inner horizontal shelf adjacent outwardly sloped region 53b
55 semicircular recess on top side of modular block
100a-100i modular panels
112 top end of modular panel
114 bottom end of modular panel
116 first side of modular panel
118 second side of modular panel
120, 120a-b male connection element of modular panels
124 front face of modular panel
126 back face of modular panel
128a-128c female connection element(s) of modular panels a' height of modular panel
b' length of modular panel
c' width of modular panel
130 horizontal bore of modular panels
132a-132c vertical bore(s) of modular panels

What is claimed is:

1. An interlocking system of modular units engageable to form vertically and horizontally stable assemblies, the modular units comprising:
a plurality of modular blocks each comprising:
top and bottom sides, front and back faces, a first end, and a second end,
a first horizontal channel recessed in the top side and extending between the first end and a central point proximal to the second end of each modular block on the top side thereof,
a second horizontal channel recessed in the bottom side and extending between the first end and the central point proximal to the second end of each modular block on the bottom side thereof,
at least one vertical bore extending through each modular block from the top side to the bottom side thereof,
a male block connection element positioned on (i) the first end or (ii) the first end and the second end, and
a female block connection element positioned opposite the male block connection element,
wherein the male block connection element extends along the first and second horizontal channels and is configured for attachment to a respective said female block connection element of another modular block of the plurality of modular blocks,
wherein the first horizontal channel of a first modular block of the plurality of modular blocks is configured for connection with the second horizontal channel of a second modular block of the plurality of modular blocks and forms a horizontal bore therebetween; and
a plurality of modular panels comprising:
top and bottom ends defining a modular panel length, front and back faces, and first and second sides defining a modular panel width,
at least one vertical bore extending through each modular panel from the top end to the bottom end thereof, and
a male panel connection element positioned on either or both of the first side and the second side, the male panel connection element configured for attachment to a female panel connection element of another modular panel of the plurality of modular panels,
wherein the plurality of the modular blocks and modular panels are engageable to form any of an interior wall, a floor, a ceiling, an exterior wall, or a roof.

2. The system of claim 1, wherein, for each modular block, the male block connection element is positioned on each of the first and second ends.

3. The system of claim 1, wherein each modular block comprises:
the male block connection element positioned on the first end, and
the female block connection element positioned on (i) the second end, (ii) the front face proximal to the second end, (iii) the back face proximal to the second end, or any combination of (i)-(iii),
wherein the female block connection element extends inward to the central point proximal to the second end.

4. The system of claim 1, wherein each modular block, comprises three vertical bores spaced apart between the first and second ends.

5. The system of claim 1, wherein each modular panel comprises:
the male panel connection element positioned on the first side, and
a female panel connection element positioned on the second side, the front face proximal to the second side, the back face proximal to the second side, or a combination thereof.

6. The system of claim 1, wherein each modular panel comprises:
three vertical bores centrally located on the modular panel between the front and back faces, and spaced apart between the first and second sides.

7. The system of claim 1, wherein each modular panel comprises:
the male panel connection element positioned on each of the first and second sides.

8. The system of claim 1, wherein each modular panel comprises:
at least one horizontal bore extending through the modular panel from the first side to the second side thereof, wherein the at least one horizontal bore intersects the at least one vertical bore forming a continuous channel extending both vertically and horizontally.

9. The system of claim 1, wherein the first horizontal channel of each modular block comprises:
an outer horizontal shelf adjacent each of the front and back faces,
an inner horizontal shelf spaced apart from the outer horizontal shelf on each of the front and back faces and connected thereto by an outwardly sloped region, and
a semicircular recess extending between the inner horizontal shelf on each of the front and back faces.

10. The system of claim 9, wherein the second horizontal channel of each modular block comprises:
an outer horizontal shelf adjacent each of the front and back faces,
an inner horizontal shelf spaced apart from the outer horizontal shelf on each of the front and back faces and connected thereto by an inwardly sloped region, and
a semicircular recess extending between the inner horizontal shelf on each of the front and back faces,
wherein the semicircular recess of each of the first and second horizontal channels form the horizontal bore when adjacent modular blocks of the plurality of modular blocks are connected.

11. The system of claim 1, wherein the stable assemblies include reinforcement elements in at least one of the vertical bore or the horizontal bore.

12. The system of claim 11, wherein the reinforcement elements include any one or more of poured concrete, hybrid construction material, re-bar, and threaded attachment elements.

13. The system of claim 1, wherein each modular panel is formed of a hybrid construction material comprising:
a cementitious binder;
an aggregate; and
10 to 60 wt. % of a hybrid additive, wherein the wt. % is based on a total weight of the hybrid construction material.

14. The system of claim 13, wherein the hybrid additive comprises spherical or non-spherical pellets coated with a cementitious material that includes one or more of calcium carbonate, pozzolanic materials, graphene, or carbon nanotubes.

15. The system of claim 1, wherein each modular block is formed of a hybrid construction material comprising:
   a cementitious binder;
   an aggregate; and
   10 to 60 wt. % of a hybrid additive comprising a plastic or polymeric material having a size of 5 um to 50 mm, wherein the wt. % is based on a total weight of the hybrid construction material.

16. The system of claim 15, wherein the plastic or polymeric material of the hybrid additive is in a form of pellets coated with a cementitious material that includes one or more of calcium carbonate, pozzolanic materials, graphene, or carbon nanotubes.

17. The system of claim 16, wherein the pellets have a length of 3-13 mm, a diameter of 1-13 mm, an end curvature of 1° to 30° measured as a total deflection from a longitudinal axis of the pellet, and comprise dimples, indentations, or inclusions on a surface of the pellet that contain the cementitious material.

18. A residential or commercial building formed in part using the interlocking system of modular units of claim 1.

* * * * *